United States Patent [19]

Pickens et al.

[11] Patent Number: 5,032,359
[45] Date of Patent: Jul. 16, 1991

[54] ULTRA HIGH STRENGTH WELDABLE ALUMINUM-LITHIUM ALLOYS

[75] Inventors: Joseph R. Pickens, Beltsville; Frank H. Heubaum, Baltimore; Lawrence S. Kramer, Baltimore; K. Sharvan Kumar, Baltimore, all of Md.

[73] Assignee: Martin Marietta Corporation, Bethesda, Md.

[21] Appl. No.: 327,927

[22] Filed: Mar. 23, 1989

Related U.S. Application Data

[63] Continuation-in-part of Ser. No. 83,333, Aug. 10, 1987, abandoned.

[51] Int. Cl.$^5$ ............................................. C22C 21/06
[52] U.S. Cl. ................................... 420/533; 148/417; 148/439; 148/440; 420/539; 420/543; 420/545
[58] Field of Search ............... 420/533, 539, 542, 543, 420/545; 148/416-418, 438-440

[56] References Cited

U.S. PATENT DOCUMENTS

| 1,620,082 | 3/1927 | Czochralski | 420/528 |
|---|---|---|---|
| 2,381,219 | 8/1945 | Le Baron | 75/139 |
| 2,915,391 | 12/1959 | Criner | 75/142 |
| 3,288,601 | 11/1966 | Flemings et al. | 75/142 |
| 3,306,717 | 2/1967 | Lindstrand | 29/197 |
| 3,346,370 | 10/1967 | Jaqaciak | 75/147 |
| 3,563,730 | 2/1971 | Bach et al. | 75/135 |
| 3,720,508 | 3/1973 | Brock et al. | 75/147 |
| 3,741,827 | 6/1973 | Reynolds et al. | 148/159 |
| 3,794,531 | 2/1974 | Markworth et al. | 148/159 |
| 3,876,474 | 4/1975 | Watts et al. | 148/32 |
| 3,925,067 | 12/1975 | Sperry et al. | 75/142 |
| 4,033,794 | 7/1977 | Stowell et al. | 148/32 |
| 4,094,705 | 6/1978 | Sperry et al. | 148/2 |
| 4,164,434 | 8/1979 | Fister et al. | 148/2 |
| 4,584,173 | 4/1986 | Gray et al. | 420/533 |
| 4,588,553 | 5/1986 | Evans et al. | 420/533 |
| 4,594,222 | 6/1986 | Heck et al. | 420/529 |
| 4,597,792 | 7/1986 | Webster | 75/249 |
| 4,603,029 | 7/1986 | Quist et al. | 420/535 |
| 4,624,717 | 11/1986 | Miller | 148/12.7 A |
| 4,626,409 | 12/1986 | Miller | 420/533 |
| 4,629,505 | 12/1986 | Paris | 75/228 |
| 4,661,172 | 4/1987 | Skinner et al. | 148/12.7 A |
| 4,735,774 | 4/1988 | Narayanan | 420/533 |
| 4,758,286 | 7/1988 | DuBost et al. | 148/12.7 A |
| 4,772,342 | 9/1988 | Polmear | 148/418 |
| 4,816,087 | 3/1989 | Cho | 148/2 |

FOREIGN PATENT DOCUMENTS

| 165317 | 11/1952 | Australia | 75/143 |
|---|---|---|---|
| 863262 | 2/1971 | Canada | 75/82 |
| 2561261 | 9/1985 | France | 420/533 |
| 353891 | 7/1931 | United Kingdom . | |
| 1172736 | 12/1969 | United Kingdom . | |
| 2115836 | 9/1983 | United Kingdom . | |
| 2121822 | 7/1984 | United Kingdom . | |
| 2137227 | 10/1984 | United Kingdom . | |

OTHER PUBLICATIONS

"Development of an Experimental Wrought Aluminum Alloy for use at Elevated Temperatures", Polmear, *Aluminum Alloys: Their Physical and Mechanical Properties*, E. A. Starke, Jr. & T. H. Sanders, Jr., editors, vol. I of Conference Proceedings of Int'l Conf., Univ. of Va., Charlottesville, VA, 15–20, Jun. 1986, pp. 661–674, Chameleon Press, London.

Meister and Martin, "Welding of Aluminum & Aluminum Alloys", Defense Metals Information Center, Battelle Memorial Institute, Columbus, Ohio 1967, pp. 47–49.

(List continued on next page.)

*Primary Examiner*—R. Dean
*Assistant Examiner*—Robert R. Koehler
*Attorney, Agent, or Firm*—Herbert W. Mylius; Alan G. Towner; Gay Chin

[57] ABSTRACT

A family of alloys based upon aluminum-copper-magnesium-silver alloys to which lithium has been added, within specified ranges, exhibits superior ambient- and elevated-temperature strength, superior ductility at ambient and elevated temperatures, extrudability, forgeability, weldability, and an unexpected natural aging response.

84 Claims, 18 Drawing Sheets

ISOCHRONAL AGING CURVES FOR Al-Cu-Mg-Ag-Li ALLOY 049

OTHER PUBLICATIONS

Yo Kojima et al., "Effects of Lithium Addition on the Elevated Temperature Properties of 2219 Alloy", *Journal of Japan Institute of Light Metals,* vol. 36, No. 11, Nov. 1986, pp. 737-743.

Hayashi et al., "Aging Phenomena of Al-Li-Mg Alloy Affected by Additional Elements", Journal of Japan Institute of Light Metals, vol. 32, No. 7, Jul., 1982.

Marchive & Charue, "Procesing & Properties", *4th International Aluminum Lighium Conference,* Champier, DuBost, Miannay & Sabetay, eds., Proceedings of Int'l Conference, 10-12, Jun., 1987, Paris, pp. 43-49.

Bretz, "First Generation Products-2090", *Alithalite Alloys:* 1987 *Update,* Kar, Agrawal, Quist, eds. Conference Proceedings of International Aluminum-Lithium Symposium, Los Angeles, Calif., 25-26, Mar., 1987, pp. 1-40.

Chester & Polmear, "TEM Investigations of Precepitates in Al-Cu-Mg Alloys", *Micron,* 1980, vol. 11, pp. 311-312, Pergamon Press, Great Britain.

ISOCHRONAL AGING CURVES FOR Al-Cu-Mg-Ag-Li ALLOY 049

ISOCHRONAL AGING CURVES FOR Al-Cu-Mg-Ag-Li ALLOY 051

FIG. 3 ISOCHRONAL AGING CURVES FOR Al-Mg-Ag-Li ALLOY 050

ISOTHERMAL AGING AT 160°C FOR ALLOY 050

NATURAL AGING RESPONSE OF ALLOY 049 EXTRUSION WITH AND WITHOUT 3% STRETCH

NATURAL AGING RESPONSE OF ALLOY 051 EXTRUSION WITH AND WITHOUT 3% STRETCH

NATURAL AGING RESPONSE OF ALLOY 050 EXTRUSION WITH AND WITHOUT 3% STRETCH

ROOM TEMPERATURE TENSILE PROPERTIES OF ALLOY 049 FOR VARIOUS AGING TIMES AT 160°C

COMPRESSIVE YIELD STRENGTH OF ALLOY 051 FOR VARIOUS DEFORMATION TEMPERATURES

TENSILE YIELD STRENGTH VS. TEMPERATURE FOR ALLOY 049

ULTIMATE TENSILE STRENGTH VS. TEMPERATURE FOR ALLOY 049

Ultimate Tensile Strength vs. Weight Percent Lithium of Al-Cu Based Alloys in the SUA Temper YIELD STRENGTH VS. WEIGHT PERCENT LITHIUM OF AL-CU BASED ALLOYS IN THE SUA TEMPER NATURAL AGED STRENGTH OF THREE PERCENT STRETCHED
AL-CU BASED ALLOYS AS A FUNCTION OF LITHIUM CONTENT Natural Aged Strength of Unstretched Al-Cu Based Alloys as a Function of Lithium Content Natural Aging Response of Unstretched 049 Alloy After Quenching From 504°C Into Various Media

STRENGTH VS. ELONGATION FOR ALLOY 049

ULTRA HIGH STRENGTH WELDABLE ALUMINUM-LITHIUM ALLOYS

CROSS REFERENCE TO RELATED APPLICATIONS

This application is a continuation-in-part of U.S. Pat. Application Ser. No. 07/083,333, filed Aug. 10, 1987, now abandoned.

FIELD OF THE INVENTION

The present invention relates to lithium-containing alloys of aluminum which are characterized by a unique combination of mechanical and physical characteristics. Specifically, the aluminum-copper-magnesium-silver-lithium alloys of this invention possess exceptionally high strength, ductility, low density, excellent weldability, and an exceptional natural aging response.

BACKGROUND OF THE INVENTION

Aluminum and its alloys have long been known to have desirable properties such as low cost, relatively low density, corrosion resistance, and the ability to be fabricated relatively easily into a wide variety of shapes and configurations for various applications. Aluminum, as a base metal for alloying purposes, is generally approximately 99 per cent pure, with iron and silicon comprising the major impurities.

A number of aluminum alloys have been found having good weldability, and characteristics such as medium to high strength. Several of these aluminum alloy compositions are based upon aluminum-copper systems, wherein significant strengthening is induced by the precipitation of $CuAl_2$. In recent work, Polmear has disclosed an aluminum-copper-magnesium-silver alloy composition designed for elevated temperature service that has high room temperature strength. No weldability data for the alloy have been reported. Polmear reported that the presence of small amounts of magnesium and silver create a previously unreported novel precipitate (i.e. omega phase) which additionally strengthens the alloy; such precipitates being coherent platelets of very minimal thickness, and high stability at slightly elevated temperatures. The strengthening in such alloys appears to be a function of the presence of both magnesium and silver. See "Development of an Experimental Wrought aluminum Alloy for Use at Elevated Temperatures," Polmear, *ALUMINUM ALLOYS: THEIR PHYSICAL AND MECHANICAL PROPERTIES* E. A. Starke, Jr. and T. H. Sanders, Jr., editors, Volume I of Conference Proceedings of International Conference, University of Virginia, Charlottesville, VA 15-·-June 1986, pages 661-674, Chameleon Press, London.

Lithium additions to aluminum alloys are known to produce a variety of low density, age-hardenable alloys, such as alloys of aluminum-magnesium-lithium, and aluminum-copper-lithium. Such alloys have seen limited use, due to difficulty in melting and casting and relatively low ductility and toughness in wrought products. Among conventional commercially available aluminum-lithium alloys, the only generally accepted weldable aluminum-lithium alloy is the Soviet alloy 01420, as disclosed in British patent 1,172,736, of Fridlyander et al., comprising Al-5Mg-2Li. This alloy is reported to have medium to high strength, low density, and a modulus of elasticity higher than standard aluminum alloys. In U.S. Pat. No. 2,381,219, of I. M. LeBaron, assigned to Alcoa, aluminum base alloys containing Cu and Li are disclosed. These alloys are "Mg-free", i.e. the alloys have less than 0.01 percent Mg which is present as an impurity. In addition, the alloys disclosed by LeBaron require the presence of at least one element selected from Cd, Hg, Ag, Sn, In, and Zn. The surprising increase in strength observed in the Al-Li alloys of the present invention, containing both Ag and Mg, is not observed in LeBaron.

U.S. Pat. No. 2,915,391 to Criner, assigned to Alcoa, discloses Al-Cu-Mn base alloys containing Cu, Li, Mg, and Cd. Criner teaches that Mn is essential for developing high strength at elevated temperatures and that Cd, in combination with Mg and Li, is essential for strengthening the Al-Cu-Mn system. Criner does not achieve properties comparable to those of the present invention, i.e. ultra high strength, strong natural aging response, high ductility at several technologically useful strength levels, weldability, etc.

A paper appearing in the Journal of Japan Institute of Light Metals lists Al-Li-Mg base alloys to which one of the elements Ag, Cu, or Zn has been added (see "Aging Phenomena of Al-Li-Mg Alloy Affected by Additional Elements," Hayashi et al, Journal of Japan Institute of Light Metals, Vol. 32, No. 7, July 1982). While the reference does disclose the addition of Ag to an alloy consisting of Al, Li, and Mg, no disclosure is made of the addition of silver to a copper containing alloy. Further, the reference does not teach the addition of grain refining elements as required in the alloys of the present invention. Since the purpose of the paper is to study the effect of specific alloying additions on the aging behavior of ternary Al-Li-Mg alloys, the authors specifically desired to limit additions to the individual elements Ag, Cu, and Zn listed without combining such additional elements or adding further grain refining elements.

U.S. Pat. No. 3,306,717 to Lindstrand et al relates to filler metal for welding Al-Zn-Mg base alloys. The filler metal comprises Al with 2-8 weight percent Mg, 0.1-10 weight percent Ag, and up to 8 weight percent Si. In addition, the filler metal may contain up to 1.0 weight percent each of Mn and Cr, up to 0.5 weight percent each of Cu, Ti and V, and up to 0.1 weight percent each of Li, Zr and B. The only example given by Lindstrand et al lists a filler metal composition of Al - 5 Mg–0.9 Ag. The reference does not relate to the production of the Al-Cu-Mg-Ag-Li base alloys which are the subject of the present invention. Rather, the reference is directed to the production of Al-Mg-Ag containing alloys that are suitable for use only as welding filler metal.

SUMMARY OF THE INVENTION

It is an object of the present invention to provide relatively low density, high strength aluminum alloys.

It is another object of the present invention to provide lightweight aluminum alloys having high strength and good weldability.

By the addition of lithium to alloys similar to those suggested by Polmear, we have achieved surprisingly high strength, a degree of ductility unexpected in lithium-containing aluminum alloys, god weldability, and a natural aging response superior to any previously reported for an aluminum alloy.

DETAILED DESCRIPTION OF THE INVENTION

Figure 1:
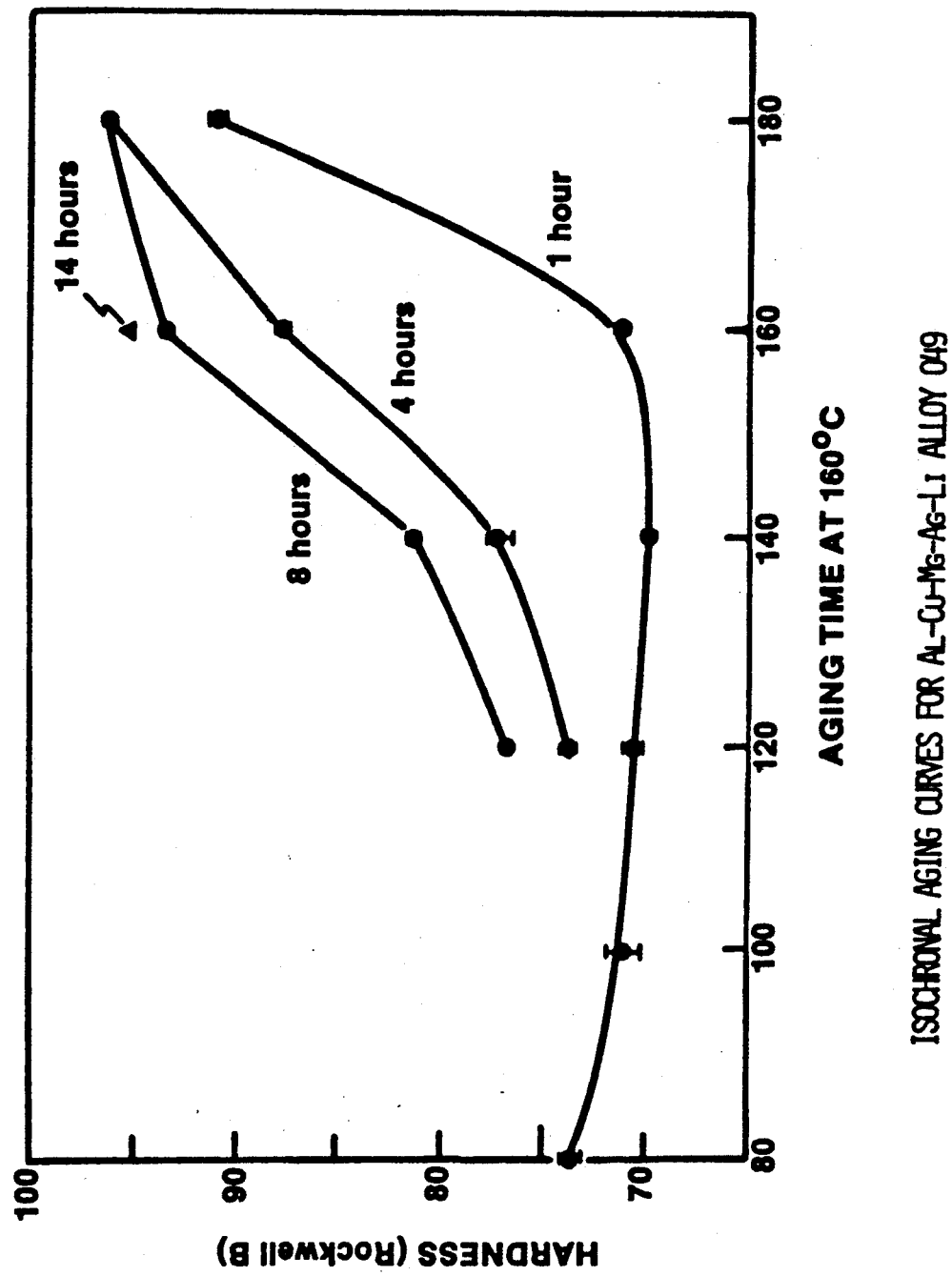
FIG. 1: Isochronal aging curves for Al-Cu-Mg-Ag-Li Alloy 049.

The primary elements of the alloys of the present invention are aluminum, copper, magnesium, silver and lithium, with grain refining additive elements such as zirconium. Although emphasis herein shall be placed upon use of zirconium for grain refinement, conventional grain refiners such as chromium, manganese, titanium, boron, vanadium, hafnium, titanium diboride, and mixtures thereof, may be used.

In general, the alloys of this invention comprise from about 2.0 percent to about 9.8 percent by weight for the total of copper plus magnesium, preferably from about 2.5 to about 8.5 percent, and more preferably from about 3.1 to about 7.5 percent. Silver may generally comprise from about 0.01 to about 2.0 percent by weight of the alloy, preferably 0.05 to 1.2 percent, and more preferably 0.10 to 1.0 percent. The highest strengths are achieved with Ag concentrations of between about 0.3 and 0.5 percent. Lithium may comprise from about 0.05 to 4.1 percent by weight of the alloy, preferably 0.20 to 3.1 percent, and most preferably 0.50 to 2.7 percent. Below about 0.05 percent Li, significant reductions in density are not realized while above about 4.1 percent the solubility limit of Li is passed. Similarly, the total amount of grain refiner present may comprise from about 0.05 to 1.0 percent by weight of the alloy, preferably 0.05 to 0.6 percent, and most preferably 0.05 to 0.5 percent.

The alloys may be broadly characterized as either aluminum-copper based, or aluminum-magnesium based, with compositions varying as set forth in Table I. In those alloys classified as aluminum-copper based, the copper may comprise from about 2.0 to about 6.8 percent by weight, preferably from about 3.0 to about 6.5 percent, more preferably from about 4.0 to about 6.5 percent, and most preferably from about 4.8 to 5.2 percent. Below about 2.0 percent Cu, strengths decrease to an unacceptable degree. Above 6.8 percent Cu, density increases while corrosion resistance and fracture toughness decrease. In such alloys, the magnesium may comprise from about 0.01 to about 3.0 weight percent, preferably 0.05 to 2.0 percent, more preferably 0.10 to 1.0 percent, and most preferably 0.3 to 0.5 percent. The highest strengths are achieved in alloys containing 0.3 to 0.5 percent Mg, with gradual decreases in tensile properties below and above this range. Tensile properties are highly dependent upon Li content in the Al-Cu based alloys. The highest strengths are attained with Li levels of 1.1–1.5 percent with decreases below about 1.0 percent and above 1.4 percent.

In those alloys classified as aluminum-magnesium based, the magnesium may comprise from about 2.0 to about 9.8 percent by weight, preferably from 2.5 to 7.0 percent, and most preferably from about 3.0 to 5.5 percent. In such alloys, the copper may comprise from 0 to 1.5 percent by weight, preferably from 0.01 to 1.0 percent, and most preferably from 0.10 to 1.0 percent.

The alloys are stronger by far than conventional alloys of the closest known compositions, and stronger than would be predicted based on the scientific literature. Furthermore, they have greater specific properties than conventional weldable Al alloys. They also have a surprisingly strong natural aging response, which is extremely useful for welding. Their weldability, defined as the resistance to hot cracking that can occur during welding, is excellent. This is surprising, in view of the disappointing weldability of recently commercialized Al-Li alloys.

Three alloy melts having the compositions as set forth hereinafter in Table II were prepared. Each alloy was cast, homogenized, extruded, solutionized, quenched, and stretched, using the parameters set forth in Table III.

TABLE I

| COMPOSITIONAL RANGES | | | | |
|---|---|---|---|---|
| | Broad | Preferred | More Preferred | Most Preferred |
| Al—Cu Based | | | | |
| Cu | 2.0–6.8 | 3.0–6.5 | 4.0–6.5 | 4.8–5.2 |
| Mg | 0.01–3.0 | 0.05–2.0 | 0.10–1.0 | 0.3–0.5 |
| Ag | 0.01–2.0 | 0.05–1.2 | 0.10–1.0 | 0.3–0.5 |
| Li | 0.05–4.1 | 0.20–3.1 | 0.50–2.7 | 1.0–1.4 |
| Grain Refiners | 0.05–1.0 | 0.05–0.6 | 0.05–0.5 | 0.08–0.2 |
| Al | Balance | Balance | Balance | Balance |
| Al—Mg Based | | | | |
| Cu | 0–1.5 | 0.01–1.0 | 0.10–1.0 | 0.10–1.0 |
| Mg | 2.0–9.8 | 2.5–7.0 | 3.0–5.5 | 3.0–5.5 |
| Ag | 0.01–2.0 | 0.05–1.2 | 0.10–1.0 | 0.3–0.5 |
| Li | 0.05–4.1 | 0.20–3.1 | 0.50–2.7 | 0.50–2.7 |
| Grain Refiners | 0.05–1.0 | 0.05–0.6 | 0.05–0.5 | 0.05–0.5 |
| Al | Balance | Balance | Balance | Balance |

TABLE II

COMPOSITIONS (Weight Percent)

| Heat # | | Cu | Mg | Ag | Li | Zr | H (ppm) | Al | Density g/cm³ | (lb/in³) |
|---|---|---|---|---|---|---|---|---|---|---|
| 049 | Planned | 6.30 | 0.40 | 0.40 | 1.40 | 0.14 | — | Balance | 2.73 | (0.098) |
| | Actual | 6.20 | 0.37 | 0.39 | 1.21 | 0.17 | 0.201 | Balance | | |
| 050 | Planned | 0 | 5.00 | 0.40 | 2.00 | 0.14 | — | Balance | 2.52 | (0.091) |
| | Actual | — | 4.90 | 0.39 | 1.91 | 0.15 | 0.541 | Balance | | |
| 051 | Planned | 6.30 | 0.40 | 0.40 | 1.70 | 0.14 | — | Balance | 2.72 | (0.098) |
| | Actual | 6.51 | 0.40 | 0.38 | 1.45 | 0.16 | 0.622 | Balance | | |

TABLE III

PROCESSING PARAMETERS

| Heat # | Pour Temperature (°C.) | Homogenization Temp. (°C.) | Homogenization Time (h) | Extrusion Ram* Temp. (°C.) | Extrusion Ram* Speed (in/min) | SHT (°C.) | Stretch % |
|---|---|---|---|---|---|---|---|
| 049 | 740 | 450 (16 h) + 510 (8 h) | | 370 | 0.10 | 504 | 3.6 |
| 050 | 740 | 450 (16 h) + 510 (8 h) | | 375 | 0.10 | 465 | 3.0 |
| 051 | 740 | 450 (16 h) + 510 (8 h) | | 373 | 0.12 | 504 | 3.0 |

*for 6-inch diameter billets in a 6.375-inch chamber extruding into 0.375 × 4.0 inch flat plate

AGING RESPONSE

Figure 2:
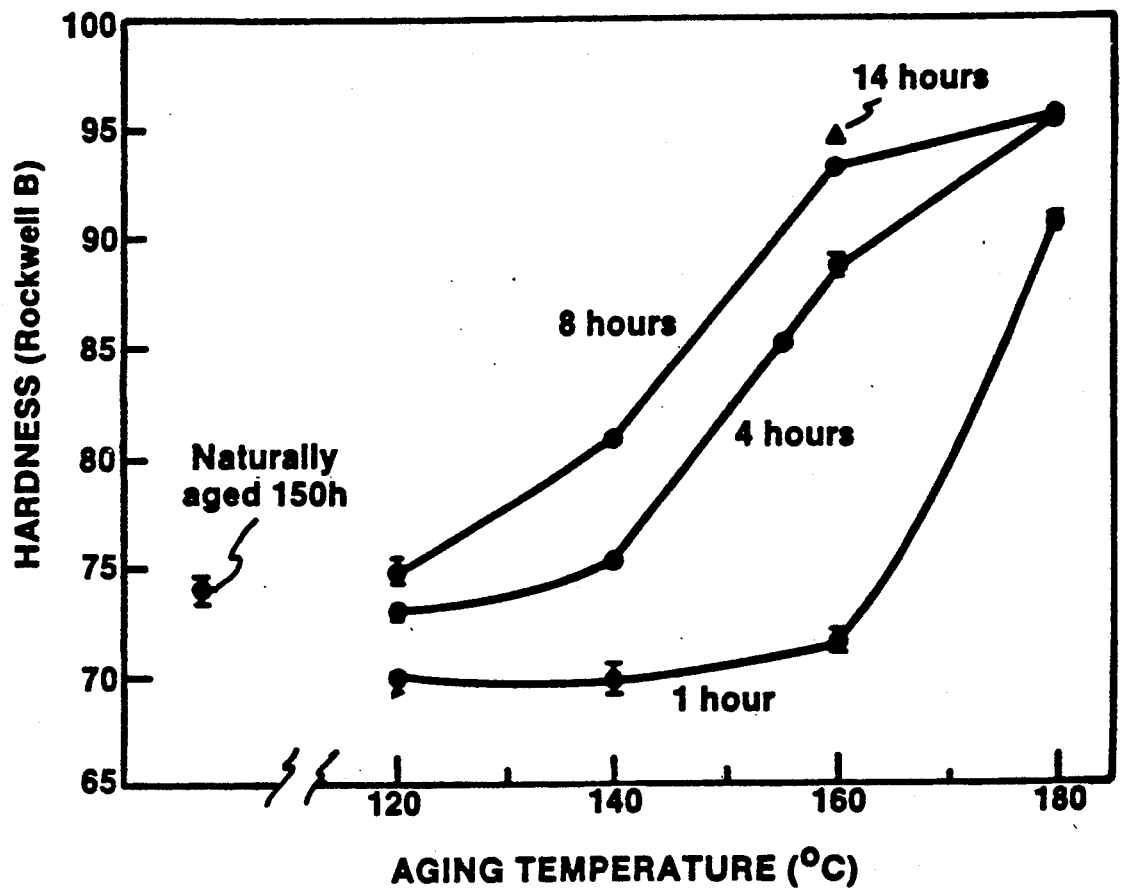
FIG. 2: Isochronal aging curves for Al-Cu-Mg-Ag-Li Alloy 051.
Figure 3:
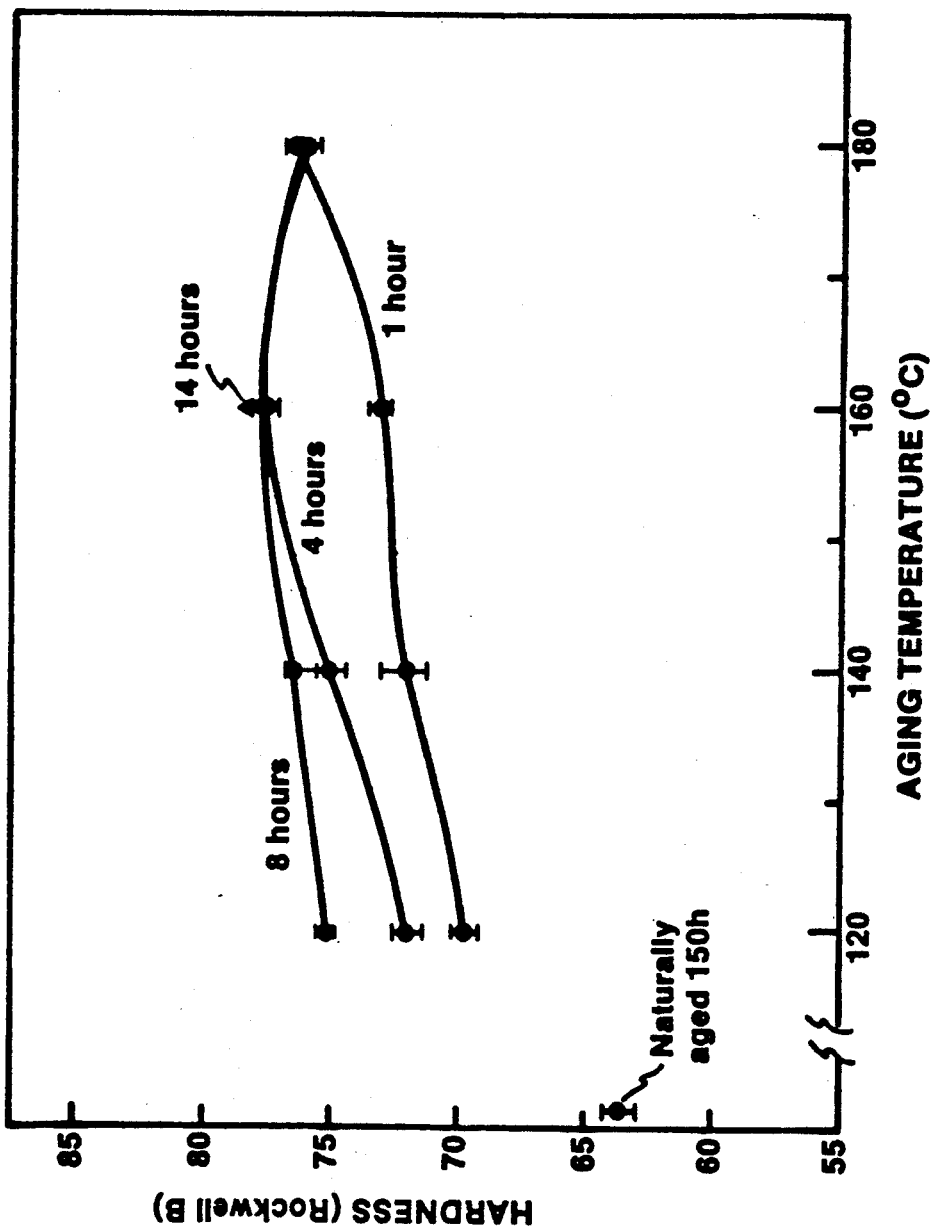
FIG. 3: Isochronal aging curves for Al-Mg-Ag-Li Alloy 050.
Figure 4:
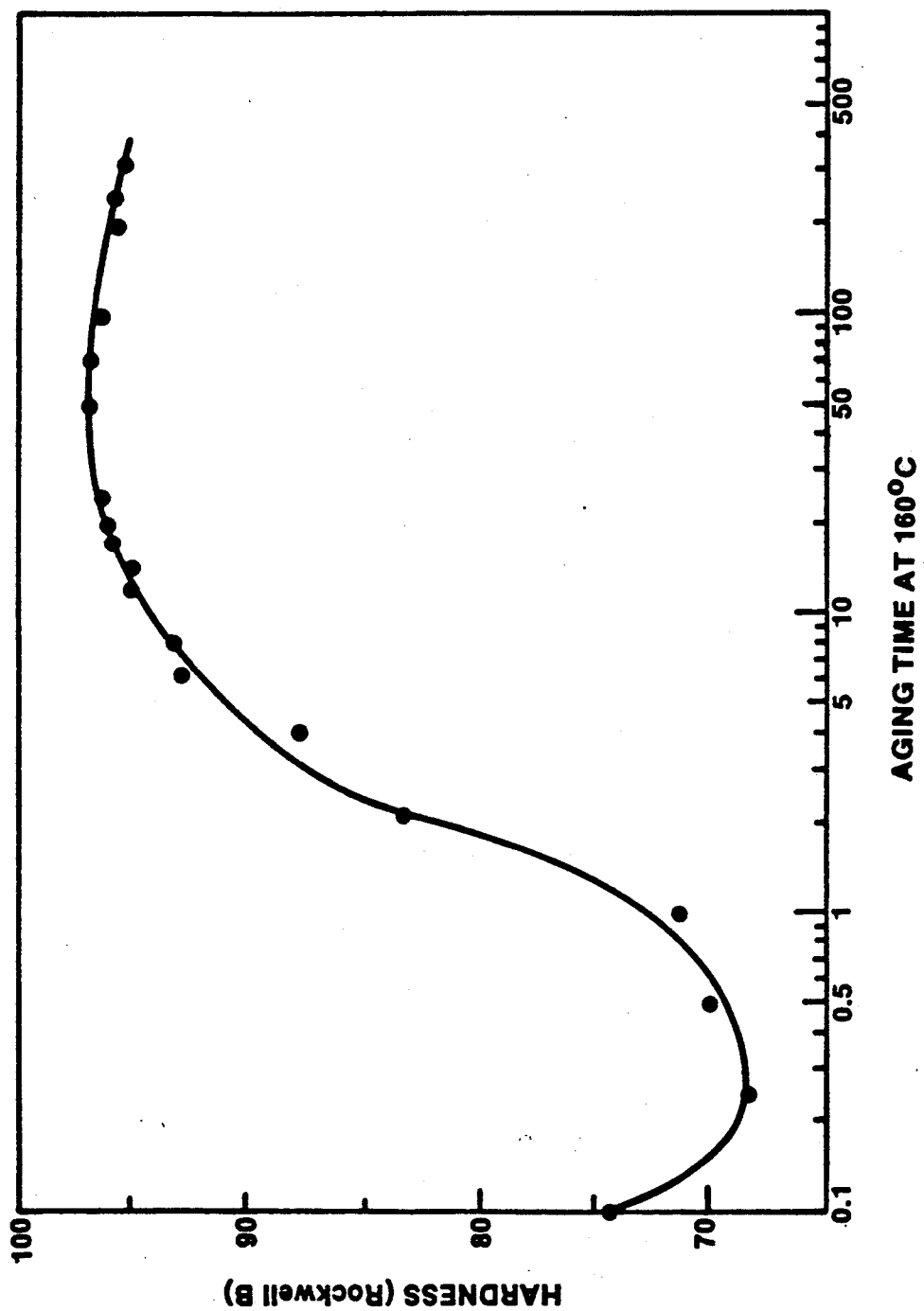
FIG. 4: Isothermal aging at 160° C. for Alloy 049.
Figure 5:
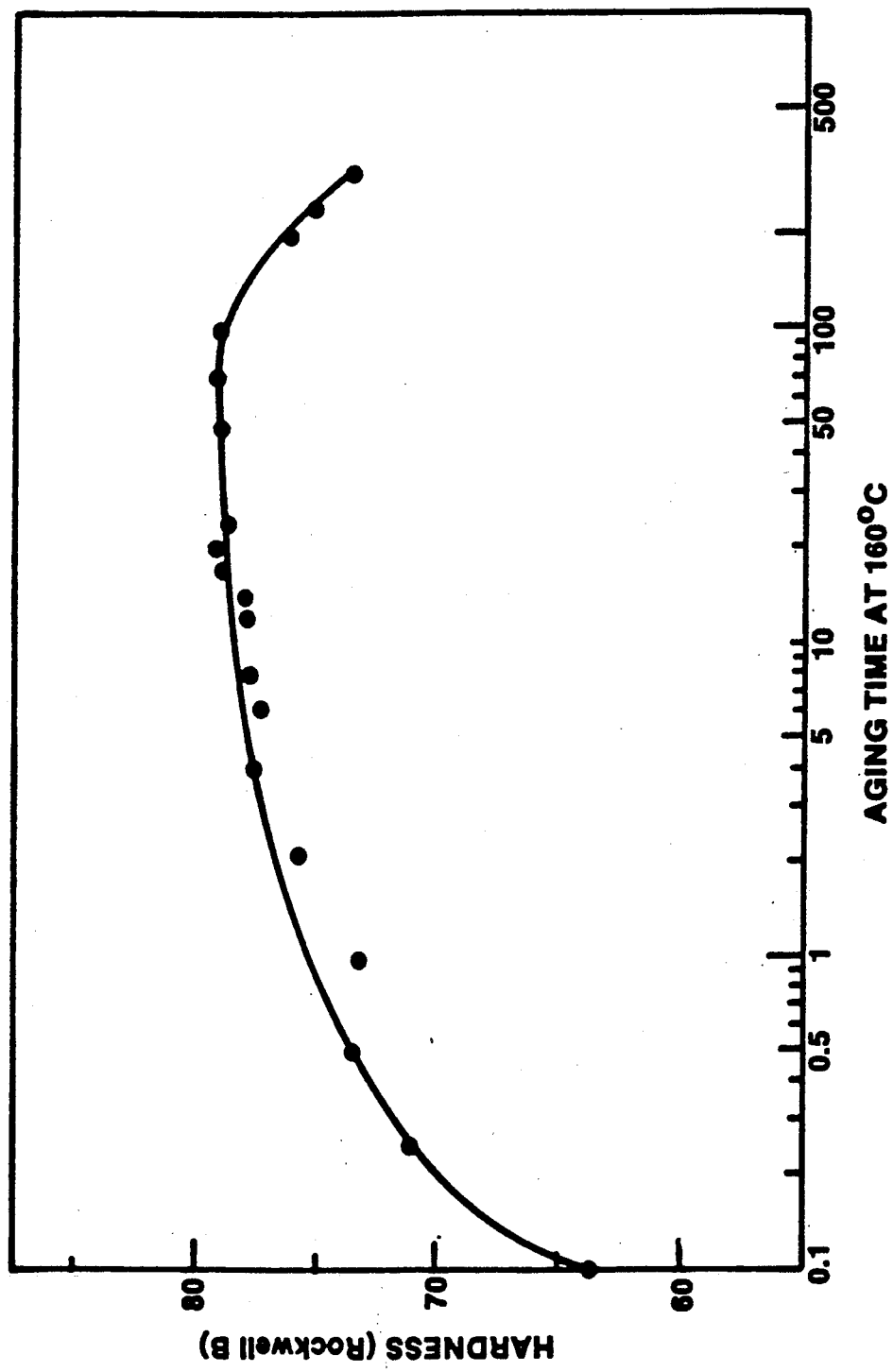
FIG. 5: Isothermal aging at 160° C. for Alloy 050.

Isochronal aging curves were developed for the three alloys to identify advantageous aging temperatures, i.e., those which would produce high hardness in a practical period of time (FIGS. 1-3). Then, artificial aging curves were developed at selected temperatures and natural aging studies were performed with different amounts of stretch (see FIGS. 4 through 8). The copper-containing alloys, e.g., alloy 049, display a rapid and extremely strong aging response at 160° C. (FIG. 4), a temperature where Al-Cu alloys normally respond sluggishly, although a decrease in hardness is noted during the early stages of aging (i.e., "reversion").

Figure 6:
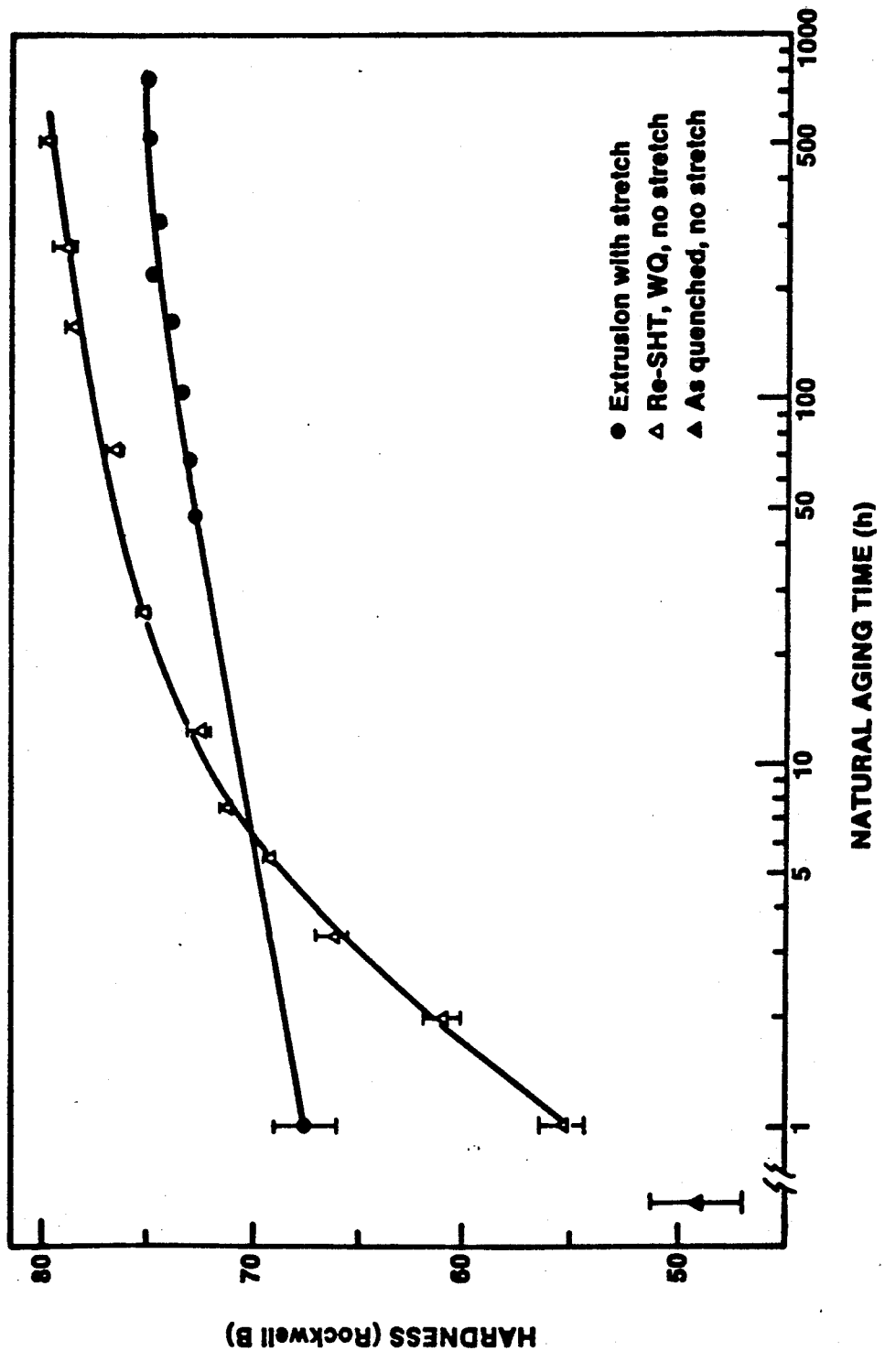
FIG. 6: Natural aging response of Alloy 049 extrusion with and without 3% stretch.
Figure 7:
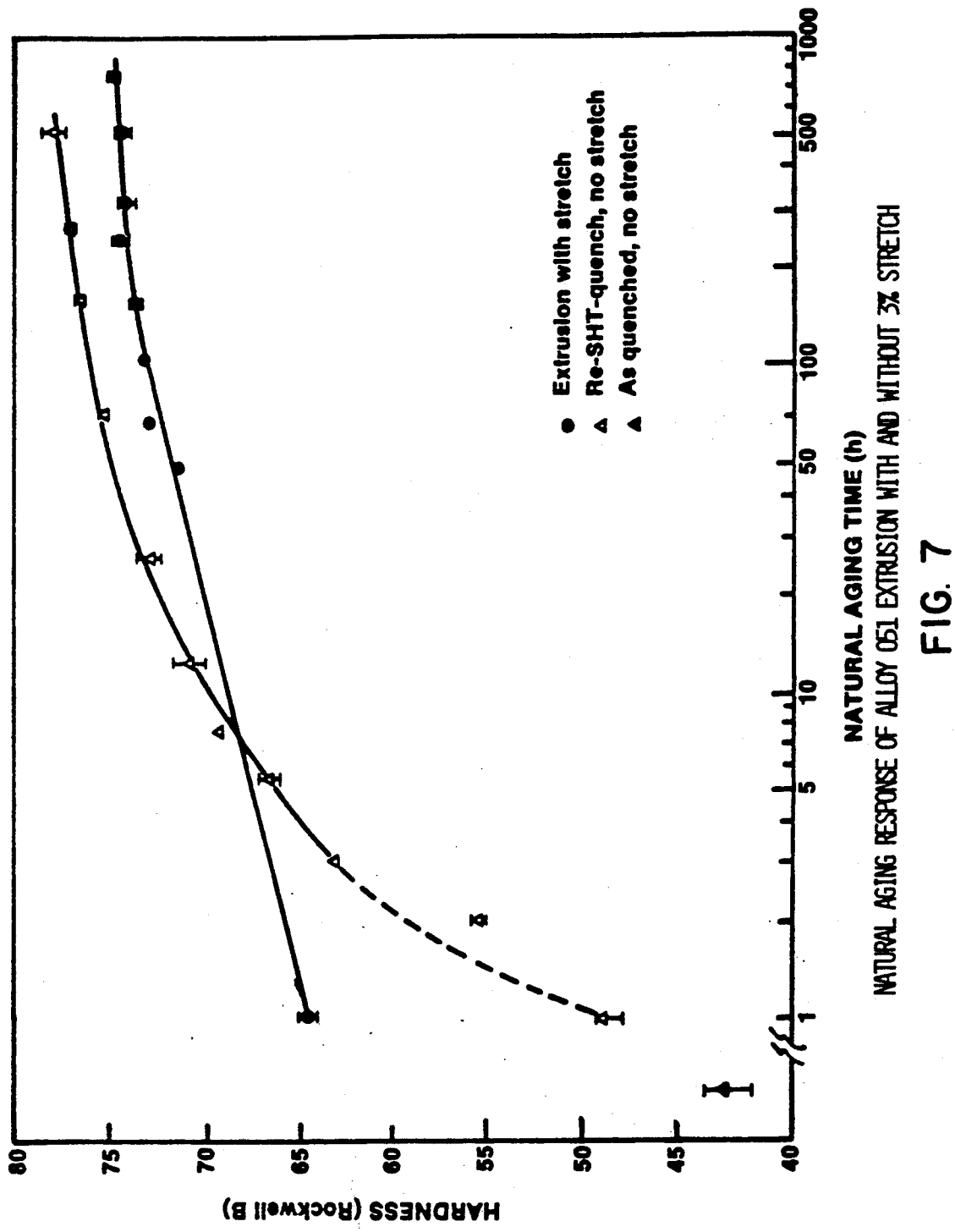
FIG. 7: Natural aging response of Alloy 051 extrusion with and without 3% stretch.
Figure 8:
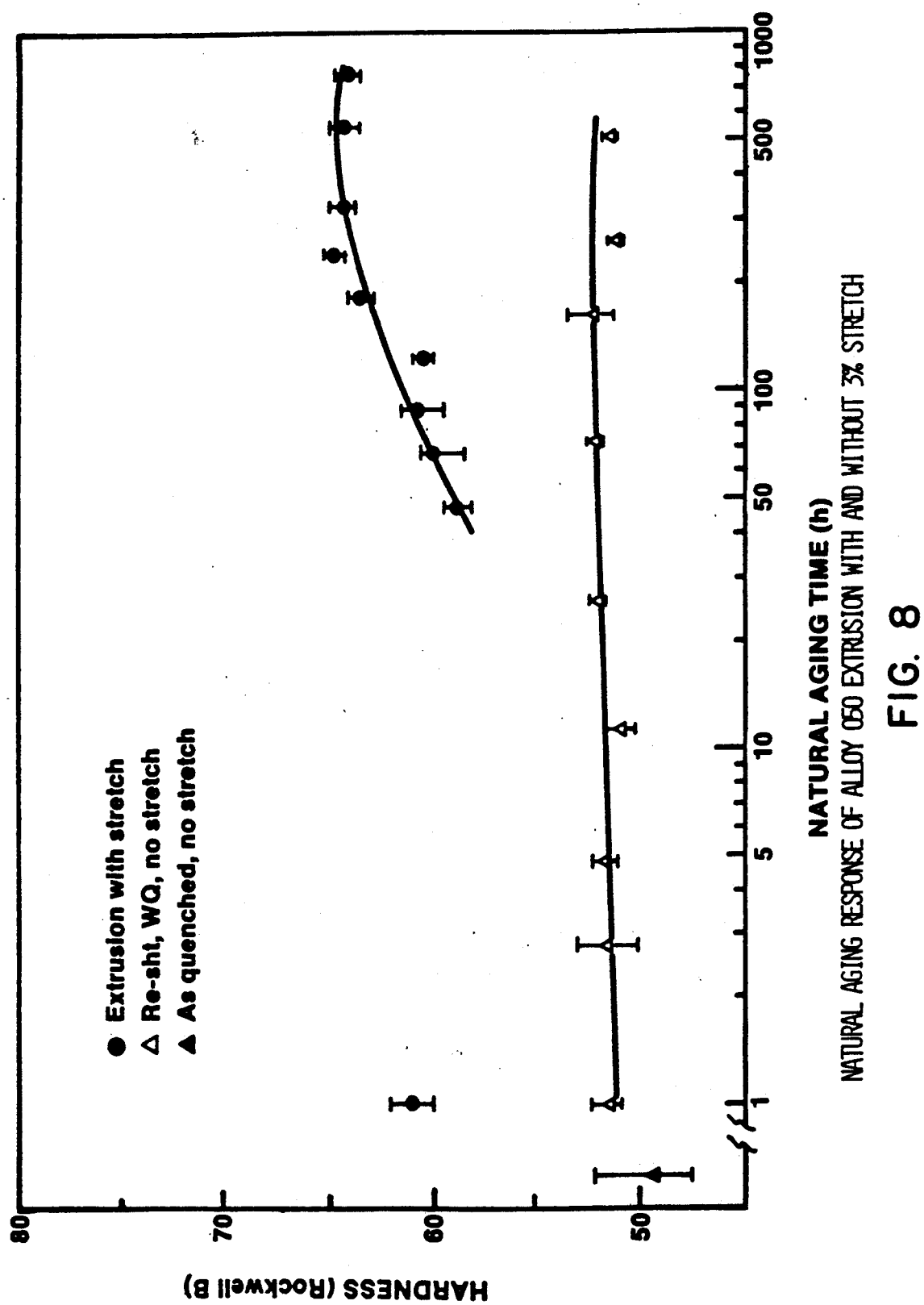
FIG. 8: Natural aging response of Alloy 050 extrusion with and without 3% stretch.

The Al-Cu-Mg-Ag-Li alloys show a natural aging response that is extraordinary, and particularly significant in terms of utility (FIGS. 6, 7). The response is so rapid for alloy 049 that within ten hours after quenching, hardness increases from 48 to 72 $R_B$, both with a 3% cold stretch prior to aging, and also without prior cold work. This is extremely important because al.1 existing pilot-commercial Al-Li alloys have insufficient strength to replace existing high technology alloys unless they are cold worked prior to aging. This is especially problematical for forging alloys, where it is most often not practical to induce cold work prior to aging. It is significant that the natural aging response without cold work is ultimately greater than that with cold work, an extremely beneficial attribute for forging. This natural aging response is observed for both heats 049 and 051. Alloy 050 displayed a slight natural aging response with no stretch, and a more rapid response with stretch (FIG. 8).

In contrast, known 2xxx alloys have a very slight, insignificant natural aging response without prior cold work. Ultimate tensile strengths such as were obtained with the subject alloys were totally unanticipated on the basis of 2xxx alloys.

TENSILE PROPERTIES

The alloys were tested in tension in various aging conditions in both the longitudinal (L) and long transverse (LT) directions. In Table IV, one can see that the properties are clearly exceptional and substantially stronger than any conventional weldable aluminum alloy, and also stronger than Soviet alloy 01420, the only commercial Al-Li alloy designed to be weldable.

The highest strengths reported are generally in the "slightly underaged" (SUA) temper, where toughness is expected to be higher than in the peak-aged temper. One can look at the artificial aging curves (FIGS. 4 and 5) to assess the degree of underaging in the 160° C. (24h) temper reported.

The new alloys also demonstrate unexpectedly good properties in the naturally aged condition (Table V). In fact, Al-Cu-Mg-Ag-Li alloy 049 is stronger in the naturally aged condition than any conventional weldable aluminum alloy is in its peak strength condition. This has important implications for welding, where a strong natural aging response provides the potential to restore strength in weldments. Moreover, it is extremely significant that this exceptional natural aging response exists without prior cold work. Consequently, a useful vehicle exists to increase the strength of weldments and forgings in which inducing cold work is often not practical. Even better naturally aged properties were obtained in subsequently prepared alloys, as described hereinafter (Table XIV). Alloy 050, an Al-Mg-Ag-Li alloy, in the stretched and naturally aged condition (T3 temper) is essentially as strong as alloy 01420 in the artificially aged condition. The alloys of the present invention also have superb specific properties, with the specific strength of 049 almost twice that of 2219 T81 (Table VI).

Figure 9:
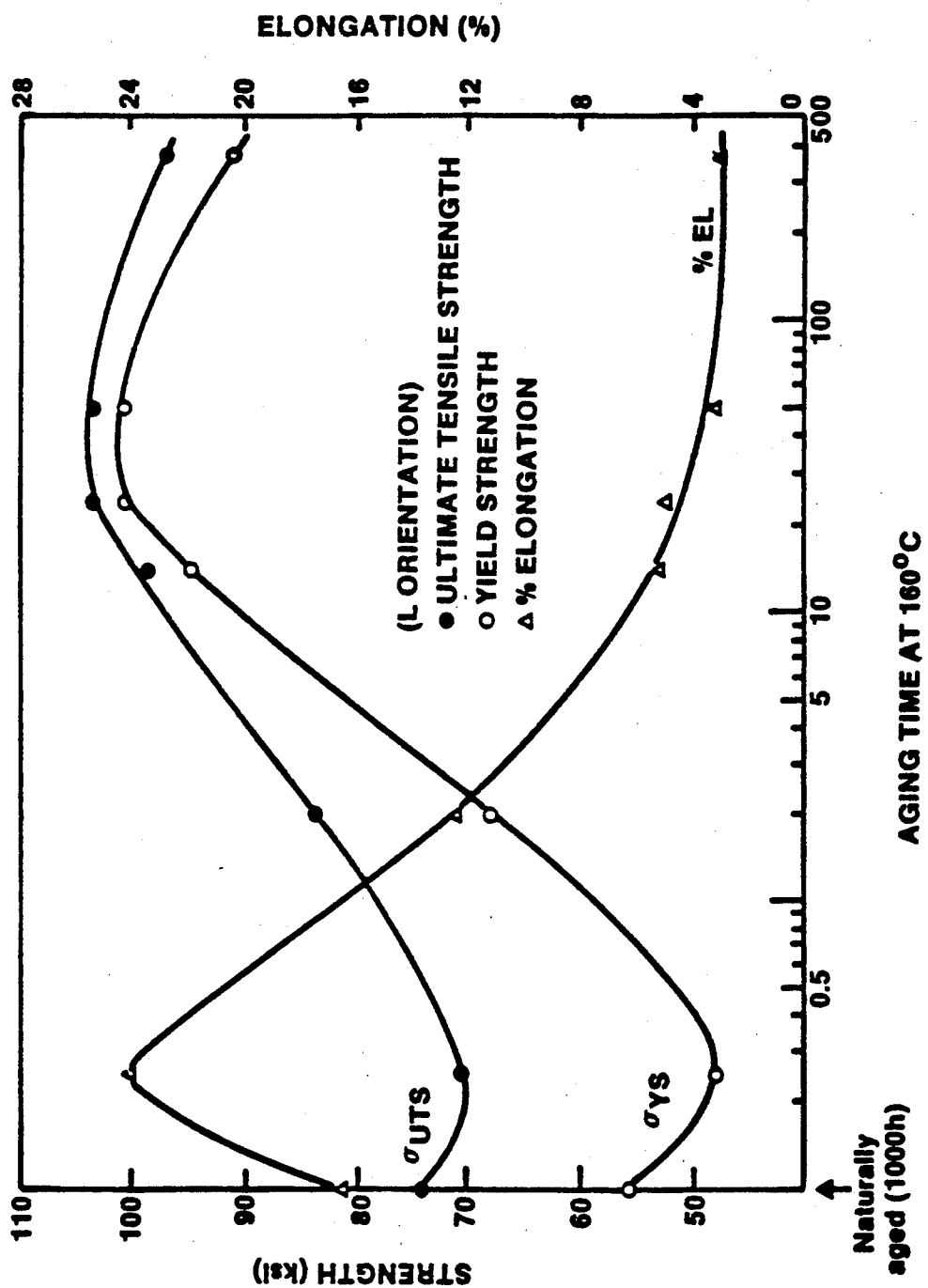
FIG. 9: Room Temperature tensile properties of Alloy 049 for various aging times at 160° C.

With artificial aging, the experimental alloys 049 and 051 are actually as strong as, or stronger than,, any ingot metallurgy aluminum base alloy, both weldable and non-weldable, as can be seen by comparison of Tables V and VII, and FIG. 9.

In contrast, the Ag-containing, Mg-free, Al-Li alloy developed by LeBaron did not show the surprising strength increases contained in the present invention. In fact, the presence of Ag decreased strength slightly (see Table VIII).

The present Al-Cu-Mg-Ag-Li alloys (049 and 051) show a significant strength increase with respect to the experimental Al-Cu-Mg-Ag-Mn-Zr-Ti-Fe-Si alloy developed by Polmear. As may be seen, improvements of 34 percent and 23 percent were observed for yield strength and ultimate tensile strength, respectively, for alloy 049 when compared to the Polmear alloy (Table VIII).

TABLE IV
TENSILE PROPERTIES OF EXPERIMENTAL AND CONVENTIONAL WELDABLE ALLOYS

| ID # | Orientation | Aging Temp °C. | (time) (h) | $E_{Measured}$ (× $10^3$ ksi) | YS (ksi) | UTS (ksi) | El % | Density (lb/in$^3$) |
|---|---|---|---|---|---|---|---|---|
| *Novel Weldable Alloys (SUA)* | | | | | | | | |
| 049 | L | 160 | (24) | 11.3 | 100.4 | 103.3 | 5.1 | 0.098 |
|  | LT | 160 | (24) | 11.3 | 94.1 | 97.8 | 1.9 | |
| 051 | L | 160 | (24) | 11.5 | 89.8 | 94.9 | 5.2 | 0.098 |
|  | LT | 160 | (24) | 11.3 | 90.2 | 92.8 | 1.3 | |
| 050 | L | 160 | (14) | 11.1 | 53.5 | 72.5 | 7.7 | 0.091 |
|  | LT | 160 | (14) | 11.1 | 52.5 | 76.2 | 14.1 | |
| *Conventional Weldable Alloys* | | | | | | | | |
| 2219 T81 | L | | | 10.6** | 44.0** | 61.0** | 6.0** | 0.102 |
| 5083 H321 | L | | | 10.3*** | 31.0*** | 44.0*** | 12.0*** | 0.096*** |
| 7039 T61 | L | | | 10.4*** | 50.0*** | 60.0*** | 14.0*** | 0.099*** |
| 01420 | L | | | 11.1* | 42.2* | 61.7* | 16.9* | 0.0908* |

*Typical actual data from 50-lb heats.
**Minima for plate. The minima for extrusion are 42.0 ksi YS, 58.0 ksi UTS.
***Handbook Minima

TABLE V
TENSILE PROPERTIES OF ALLOYS

| Alloy # | Orientation | Aging Condition Temp. °C. | (time) (h) | YS (ksi) | UTS (ksi) | El (%) |
|---|---|---|---|---|---|---|
| *Novel Alloys in Various Tempers* | | | | | | |
| 049 | L | NA* | (1000 h) | 55.6** | 74.0** | 16.5 |
|  | LT | NA* | (3000 h) | 52.0** | 71.5** | 21.7 |
|  | L | 160 | (14 h) | 94.6 | 98.2 | 5.2 |
|  | L | 160 | (24 h) | 100.4 | 103.2 | 5.1 |
| 050 | L | NA* | (1000 h) | 44.9** | 59.4** | 11.0 |
|  | LT | NA* | (3000 h) | 38.6** | 59.4** | 16.9 |
|  | L | 160 | (14 h) | 53.5 | 72.5 | 7.7 |
|  | L | 160 | (14 h) | 52.5 | 76.2 | 14.1 |
| *Handbook Property Minima (for extrusions)* | | | | | | |
| 2219 | | T81 | | 42.0 | 58.0 | 6.0 |

*NA = naturally aged with aging time following
**Cold stretched three precent prior to natural aging.

TABLE VI
SPECIFIC PROPERTIES OF EXPERIMENTAL ALLOYS
(Slightly Underaged Temper)

| Alloy # | UTS/ρ (× $10^3$ in) | E/ρ (× $10^6$ in) |
|---|---|---|
| *Novel Al—Li Weldable Alloys* | | |
| 049 | 1053 | 115 |
| 050 | 798 | 122 |
| 051 | 967 | 117 |
| *Handbook Property Minima* | | |
| 2219 T81 | 592 | 103 |

TABLE VII
Highest Strength Non-Weldable Aluminum I/M Alloys (Extrusions, Typical Values)

| Alloy | System | YS (ksi) | UTS (ksi) | El % | E (× $10^3$ ksi) | Density (lb/in$^3$) |
|---|---|---|---|---|---|---|
| 7001 T6 | Al—Zn—Mg | 91 | 98 | 9 | 10.3 | 0.103 |
| 7178 T6 | Al—Zn—Mg | 78 | 88 | 11 | 10.3 | 0.102 |
| 8091 T651 | Al—Li—Cu—Mg | 88.5 | 91.4 | 4 | 11.7 | 0.0917 |

TABLE VIII
TENSILE PROPERTIES OF VARIOUS ALLOYS

| Alloy | YS (ksi) | UTS (ksi) | El % |
|---|---|---|---|
| LeBaron Al—4.5 Cu—0.7 Mn—0.25 Si—0.15 Fe—1.0 Li—0.15 Cd | 75.9 | 82.1 | 7.8 |
| LeBaron Al—4.5 Cu—0.8 Mn—0.25 Si—0.15 Fe—1.0 Li—0.15 Cd—0.15 Ag | 74.5 | 80.6 | 7.5 |
| Polmear experimental alloy Al—6.7 Cu—0.46 Mg—0.50 Ag—0.48 Mn—0.18 Zr—0.07 Si—0.1 Fe—0.06 Ti | 75.0 | 84.1 | 7.5 |
| 049 Al—6.2 Cu—0.37 Mg—0.39 Ag—1.21 Li—0.17 Zr | 100.4 | 103.3 | 5.1 |

Weldability

Fusion Weldability

Tungsten Inert Gas

Alloy 049 was manually TIG (tungsten inert gas) welded with both conventional 2319 filler and parent metal filler. Alloy 050 was manually TIG welded with both conventional 5356 filler and parent metal filler. V-notch butt weldments with a fair amount of constraint were made. TIG (tungsten inert gas) welding. The V-notch weldment does not produce weldments of particularly high joint efficiency (i.e. strength weldment/strength parent alloy). However, constrained V-notch butt weldments are instructive for demonstrating weldability when welding parameters are not known for a new material. In addition, automatic TIG square butt weldments were made on alloys 049, 050, and 051 using conventional fillers.

Whereas weldability is defined as the resistance to hot cracking, none of the weldments displayed any hot cracking susceptibility despite the constraint imposed. Furthermore, the welding parameters used (Table IX), which were selected based on analogy to conventional alloys, led to good metal flow during welding and caused the welders to claim that the alloys welded as easily as conventional alloys 2219 and 5083.

The alloys had low hydrogen content (Table II), yet weldments did display gas-formed pores at the weld bead-parent alloy interface. The porosity is believed to have resulted from improper handling during welding. This porosity caused the weldments to fail in tension at that interface. Nevertheless, the strengths of several weldments are quite good (see Table X) and suggest that very good weld strengths are possible. Corrective care to weldment pretreatment was exercised in subsequent welding tests, and no significant porosity was detected by radiographic techniques. In fact, TIG weldments of an 049-type alloy (059, described hereinafter) using parent metal filler, passed the very stringent quality control production test for porosity which is used on the Titan missile.

Electron Beam Welding

Autogenous electron beam (EB) weldments were performed on an alloy similar to alloy 049, alloy 061 described hereinafter. A square butt weld was fabricated along the longitudinal axes of two 100mm wide plates of alloy 061. The welding was performed at 140 kv potential and 80 mA current at a travel speed of 500 mm/min. in a single pass.

The alloy proved to be readily weldable by this technique, and the two 18mm thick plates were easily joined in the full penetration pass.

The weldments were radiographed and showed negligible porosity, and long transverse tensile properties were determined. The tensile strengths were exceptionally high, and are from material in the as-welded condition with only 12 days natural aging (see Table XI). Although the apparent elongation over the 4 inch length is 0.3 percent, the deformation was localized to the narrow (about 5mm) weld zone, so the true strain-to-failure ratio in this localized region is much higher. This is supported by the much higher 9% reduction in area.

Friction Weldability

Several specimens of 049-type alloy 061 were stretched to 0.5 inch diameter, 2 inch cylindrical rods, and were friction welded using parameters in Table XII. Although a detailed study was not undertaken to develop optimized friction welding parameters, good strengths were obtained (Table XII). For example, the tensile strength of joints were as high as 57.9 ksi with no post-welding heat treatment, demonstrating that this alloy is amenable to friction welding.

TABLE IX

Welding Parameters Used for Novel Alloys

MANUAL TIG PROCEDURE

| Alloy | Filler Material | Voltage (volts) | Current (amps) | # of Passes | Time per pass second(s) | Length (inches) |
|---|---|---|---|---|---|---|
| 049 | 2319 | 18–24 | 190–250 | 4 | 155, 120, 121, 148 | (10 in.) |
| 049 | Parent | 20–24 | 150–205 | 4 | 71, 61, 41, 53 | (5 in.) |
| 050 | 5356 | 18–24 | 150–210 | 4 | 161, 138, 112, 115 | (10 in.) |
| 050 | Parent | 19–22 | 160–210 | 4 | 63, 52, 46, 48 | (5 in.) |

3/16 in. diameter, 2% thoriated tungsten electrode
Coverages: 100% He at 8 cu ft/h or 100% Ar at 25 cu ft/h.
75° V-Notch
Preheat base metal to 170° F.
Gas Cup size: ⅜ in.

AUTOMATIC TIG PROCEDURE

| Weld Pass | Voltage (Volts) | Current (Amps) | Travel Speed (in/min) | Wire Speed (in/min) |
|---|---|---|---|---|
| Seal Pass | 11.2 | 190 | 12.0 | — |
| Penetration Pass | 11.4 | 245 | 9.8 | — |
| Filler Pass | 11.7 | 195–200 | 9.8 | 46–55 |

DC current straight polarity
049 and 051 used 2319 filler wire
050 used 5356 filler wire, square butt welds
Coverages: 100% He at 8 cu ft/h. or 100% ar at 25 cu ft/h.

TABLE X

Tensile Properties from TIG Weldments

| Parent Alloy | Filler | Post-Welding Temper | Weld Bead | YS (ksi) | UTS (ksi) | El* (%) | Type of TIG Welding |
|---|---|---|---|---|---|---|---|
| 049 | 2319 | NA (500 h) | On | 31.6 | 38.9 | 3.0 | Manual |
| 049 | 2319 | NA (500 h) | Flush | 28.8 | 39.0 | 3.0 | Manual |
| 049 | 2319 | NA (500 h) | Flush | 31.8 | 47.5 | 5.7 | Auto |
| 049 | 2319 | SHT (504° C./WQ/NA (770 h) | Flush | 42.8 | 61.0 | 9.5 | Auto |
| 049 | 2319 | SHT (504° C./WQ/160° C. (24 h) | Flush | 56.8 | 58.6 | 0.4 | Auto |
| 049 | 2319 | SHT (504° C./WQ/NA (770 h) | Flush | 33.0 | 51.3 | 6.0 | Manual |
| 049 | 049 | NA (500 h) | On | 38.4 | 44.0 | 0.5 | Manual |
| 049 | 049 | NA (500 h) | Flush | 38.5 | 40.6 | 0.5 | Manual |
| 050 | 5356 | NA (500 h) | On | 22.3 | 40.6 | 6.5 | Manual |
| 050 | 5356 | NA (500 h) | Flush | 22.5 | 43.2 | 14 | Manual |
| 050 | 5356 | NA (500 h) | Flush | 24.6 | 48.0 | 13 | Auto |
| 050 | 050 | NA (500 h) | On | 27.1 | 42.8 | 6 | Manual |
| 050 | 050 | NA (500 h) | Flush | 22.5 | 51.0 | 17 | Flush |

All alloys were in the SUA temper before welding
*Elongation is from a 1-inch gage length.

TABLE XI

Long Transverse Electron Beam Weldment Properties of Alloy 061

| Temper Before Welding | Apparent YS | UTS ksi | Apparent Elongation % | Reduction in Area % |
|---|---|---|---|---|
| SUA | 60.5 | 62.4 | 0.3 | 9 |
| SUA | 60.4 | 63.0 | 0.3 | 9 |

As welded, NA (12 days).

TABLE XII

Friction Welding of Alloy 061 in SUA Temper

| Rotational Speed (rpm) | Friction Force (lbs) | Forging Force (lbs) | Condition After Welding | Tensile Strength (ksi) |
|---|---|---|---|---|
| 3000 | 1200 | 2400 | NA (4 h) | 43.8 |
| 3000 | 2000 | 3000 | NA (4 h) | 44.5 |
| 3000 | 4000 | 5000 | NA (24 h) | 40.5 |
| 3000 | 4000 | 5000 | NA (192 h) | 57.9 |
| 3000 | 4000 | 5000 | AW-160° C. (20 h) | 59.6 |

*Water quenched 15 s after friction welding.

ELEVATED TEMPERATURE DATA

Figure 10:
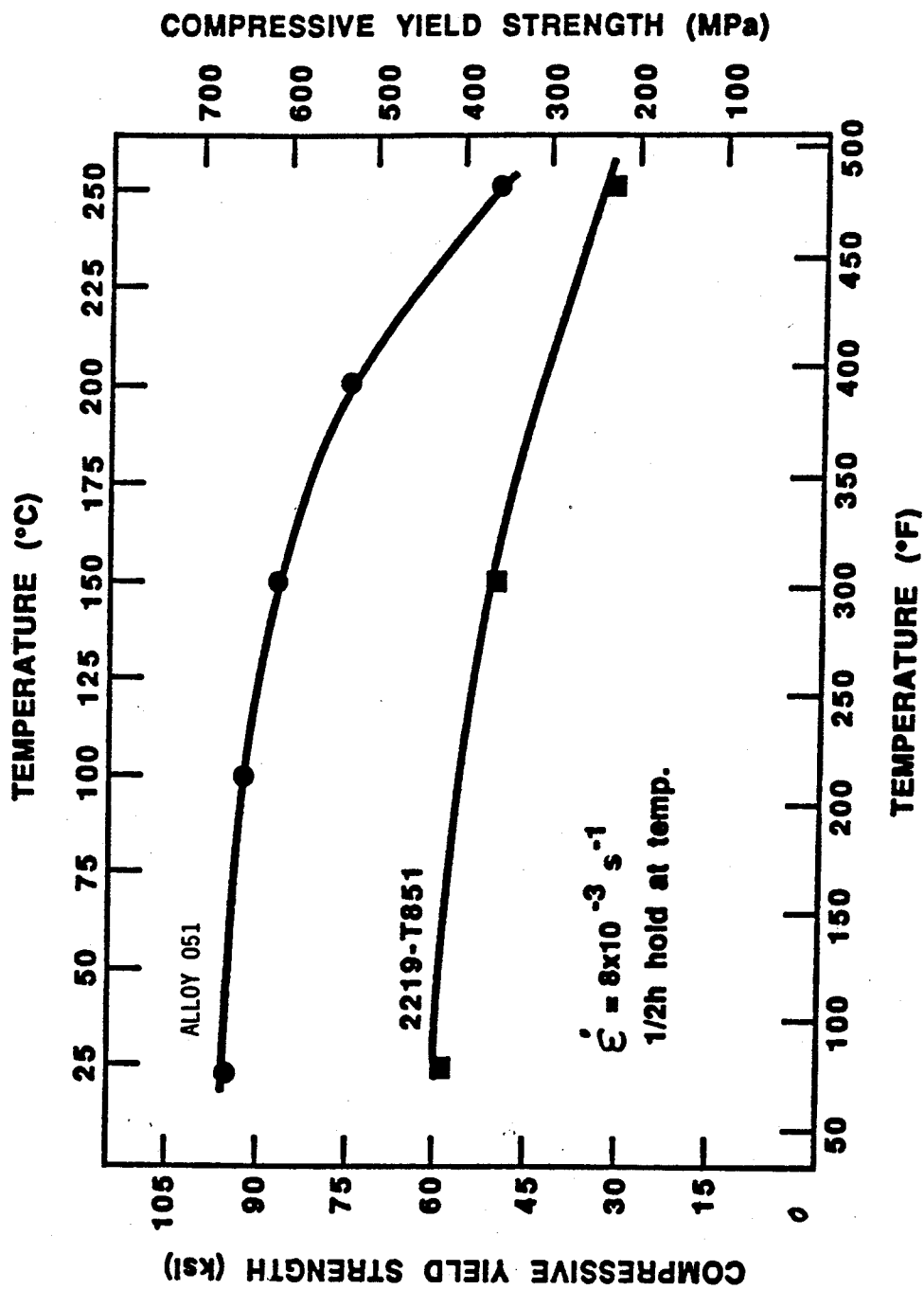
FIG. 10: Compressive yield strength of Alloy 051 for various deformation temperatures.

Elevated temperature properties were determined using hot compression tests on alloy 051 and conventional weldable alloy 2219, the leading conventional alloy for 120° C. service. (Table XIII, FIG. 10).

The compression tests were conducted at a strain rate of $8 \times 10^{-3} s^{-1}$ after holding at temperature for 30 minutes. The novel alloy showed exceptional warm temperature strength, well above that of 2219 (see FIG. 10), throughout the entire temperature range investigated, which is considered to be beyond the useable temperature range of 2219. In fact, alloy 051 has considerably higher yield strength at 200° C. than 2219 has at room temperature, and very nearly the same yield strength at 250° C. that 2219 has at room temperature.

Figure 11:
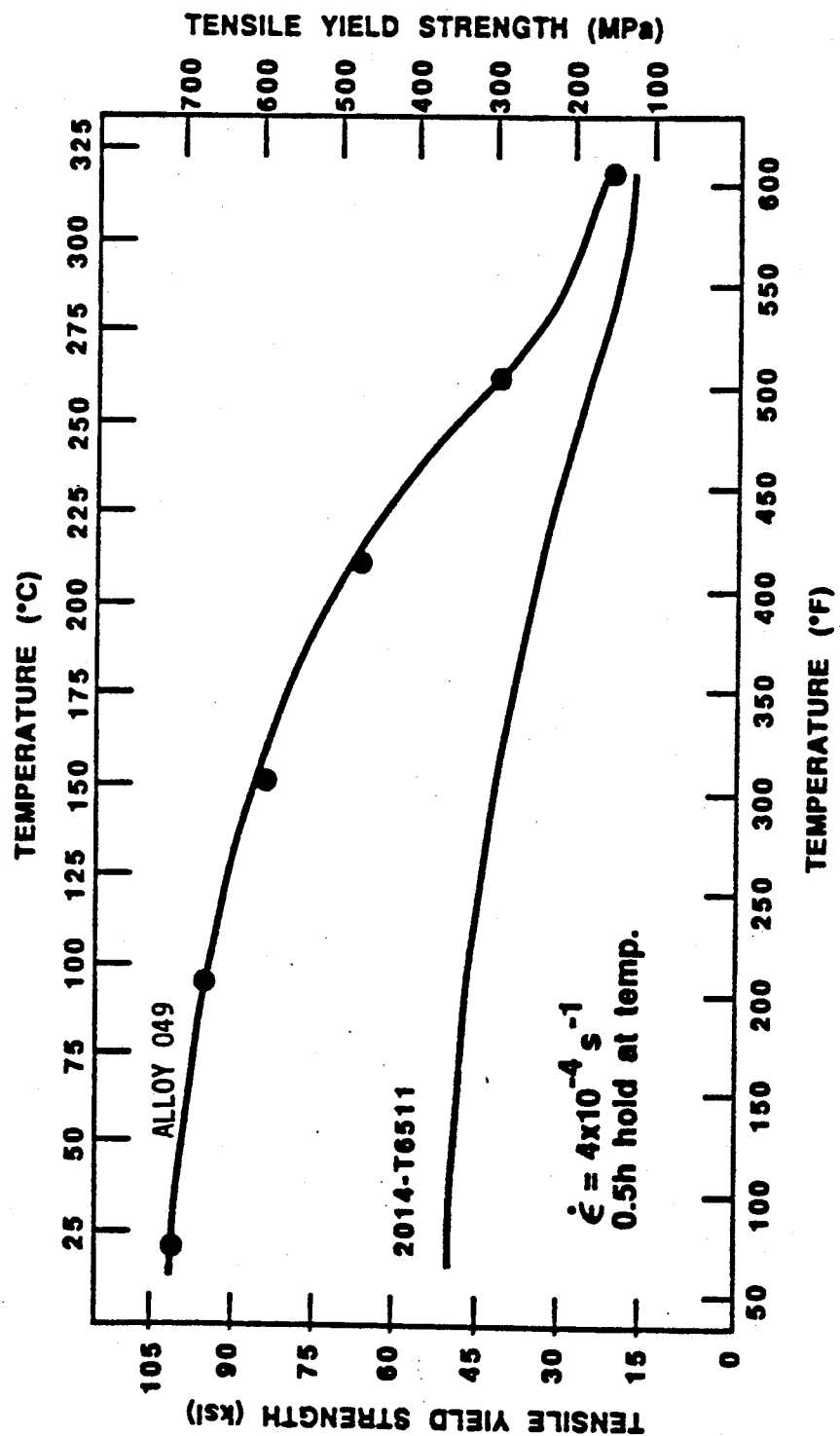
FIG. 11: Tensile yield strength vs. temperature for alloy 049.
Figure 12:
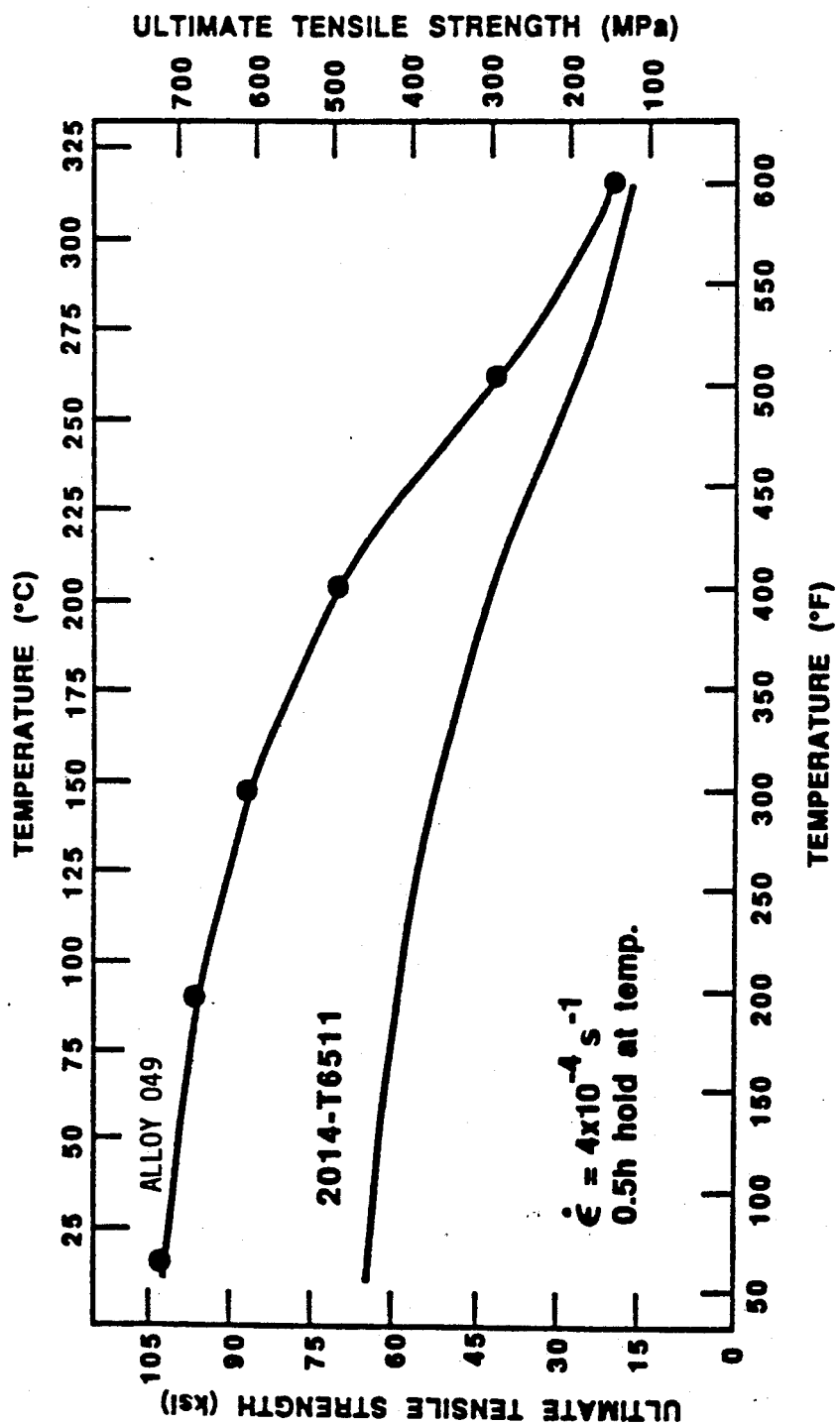
FIG. 12: Ultimate tensile strength vs. temperature for alloy 049.

Several tensile tests were performed at elevated temperatures (Tables XIII, FIGS. 11 and 12) and strength values were found to be exceptional. Both tensile and yield strengths are superior to alloy 2014.

TABLE XIII

Elevated Temperature Data for Novel Alloys and 2219

Elevated Temperature Compression Data of Novel Alloy and 2219

| Alloy | Orientation | Deformation Temperature (°C.) | YS* (ksi) |
|---|---|---|---|
| 051 | L | 24 | 94.3 |
|  |  | 100 | 92.0 |
|  |  | 150 | 84.8 |
|  |  | 200 | 74.1 |
|  |  | 250 | 52.1 |
| 2219-T87 | L | 24 | 56.0 |
|  |  | 150 | 49.4 |
|  |  | 250 | 31.3 |

Elevated Temperature Tensile Data for Alloy 049

| Temper | Deformation Temperature °C. | YS ksi | UTS ksi | El (%) | E ($\times 10^6$ psi) |
|---|---|---|---|---|---|
| SUA | 93 | 95.3 | 99.0 | 8.1 | 12.1 |
| SUA | 93 | 94.4 | 94.8 | 6.11 | 11.5 |
| NA | 93 | 55.9 | 70.6 | NA | 11.5 |
| SUA | 150 | 86.7 | 90.1 | 6.2 | 11.2 |
| SUA | 150 | 86.1 | 89.2 | 7.2 | 11.4 |
| NA | 150 | 79.6 | 83.4 | 10.5 | 10.8 |

*0.2 percent off set yield strength.

ADDITIONAL ALLOYS

Having obtained the exceptional properties demonstrated for alloys 049-051, ten additional 50-lb. heats were fabricated in accordance with the compositions set forth in Table XIV. Several tests were near-duplicates of 049 and 050, to demonstrate reproducibility, and others were attempts to improve specific properties. For example, Al-Cu based alloys similar to 049 were fabricated with higher Li levels to decrease density and increase modulus. Other Al-Cu based alloys were made with lower Cu content to decrease density and to determine whether hot cracking susceptibility increases at the Cu level investigated, as predicted by data from Al-Cu binary alloys. Meister and Martin, "Welding of Aluminum and Aluminum Alloys," Defense Metals Information Center, Battelle Memorial Institute, Columbus, Ohio, 1967.) Additionally, two Al-Cu based Alloys similar to 049 were fabricated with lower Cu levels of 3.0 to 4.5 weight percent. The compositions and tensile properties of extrusions of these alloys in the T8 temper are given in Table XIVa.

Two Al-Mg based alloys similar to 050 were prepared, one of the same nominal composition (062), and one fabricated with 0.2 percent Cu to assess the effect of Cu on strength. The alloys were cast and homogenized using parameters similar to those in Table II. Extrusion and processing parameters are in Table XIV, and comparative tensile properties are shown in Tables XV.

Figure 13:
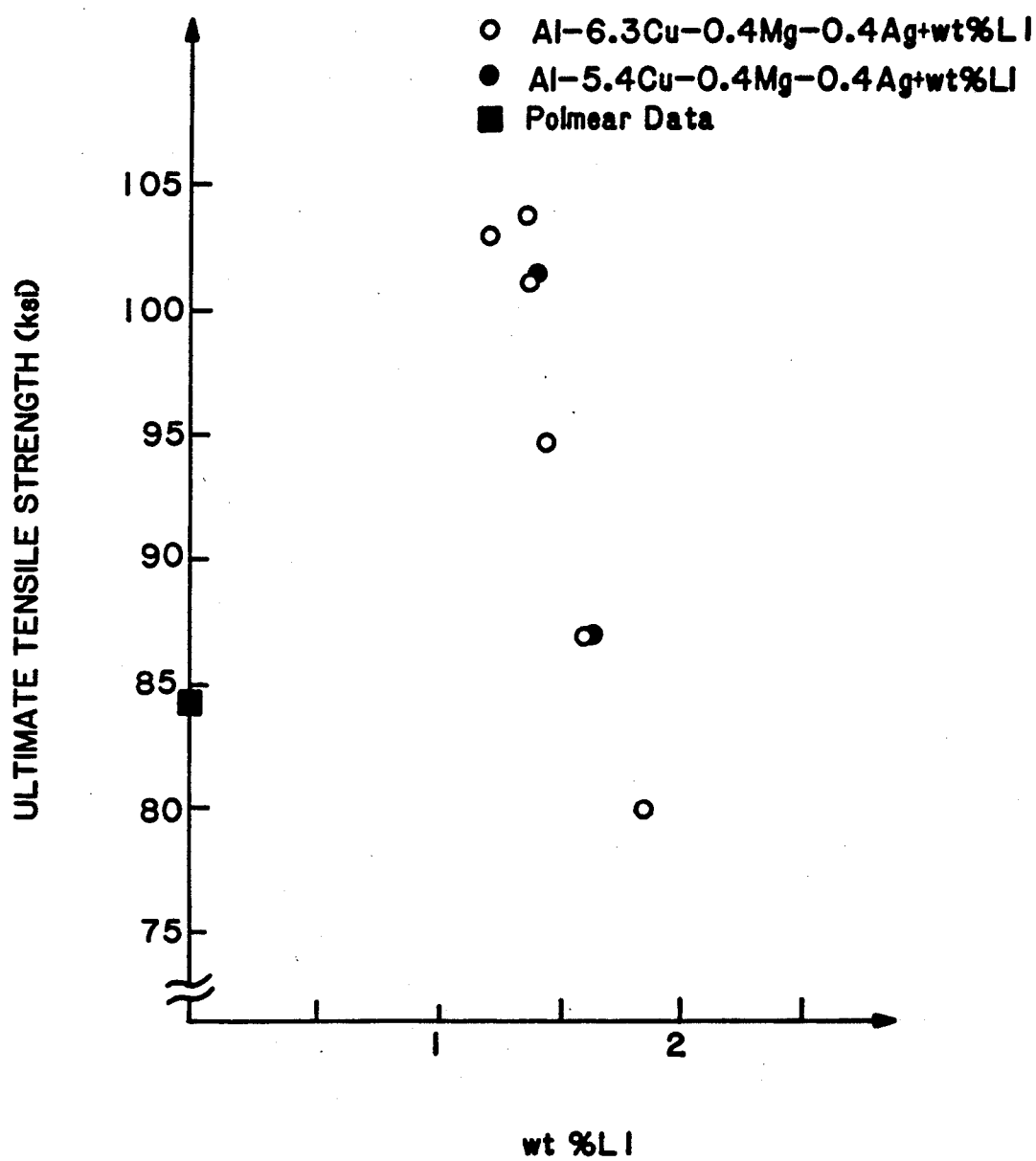
FIG. 13: Ultimate tensile strength vs. weight percent lithium of Al-Cu based alloys in the SUA temper.
Figure 14:
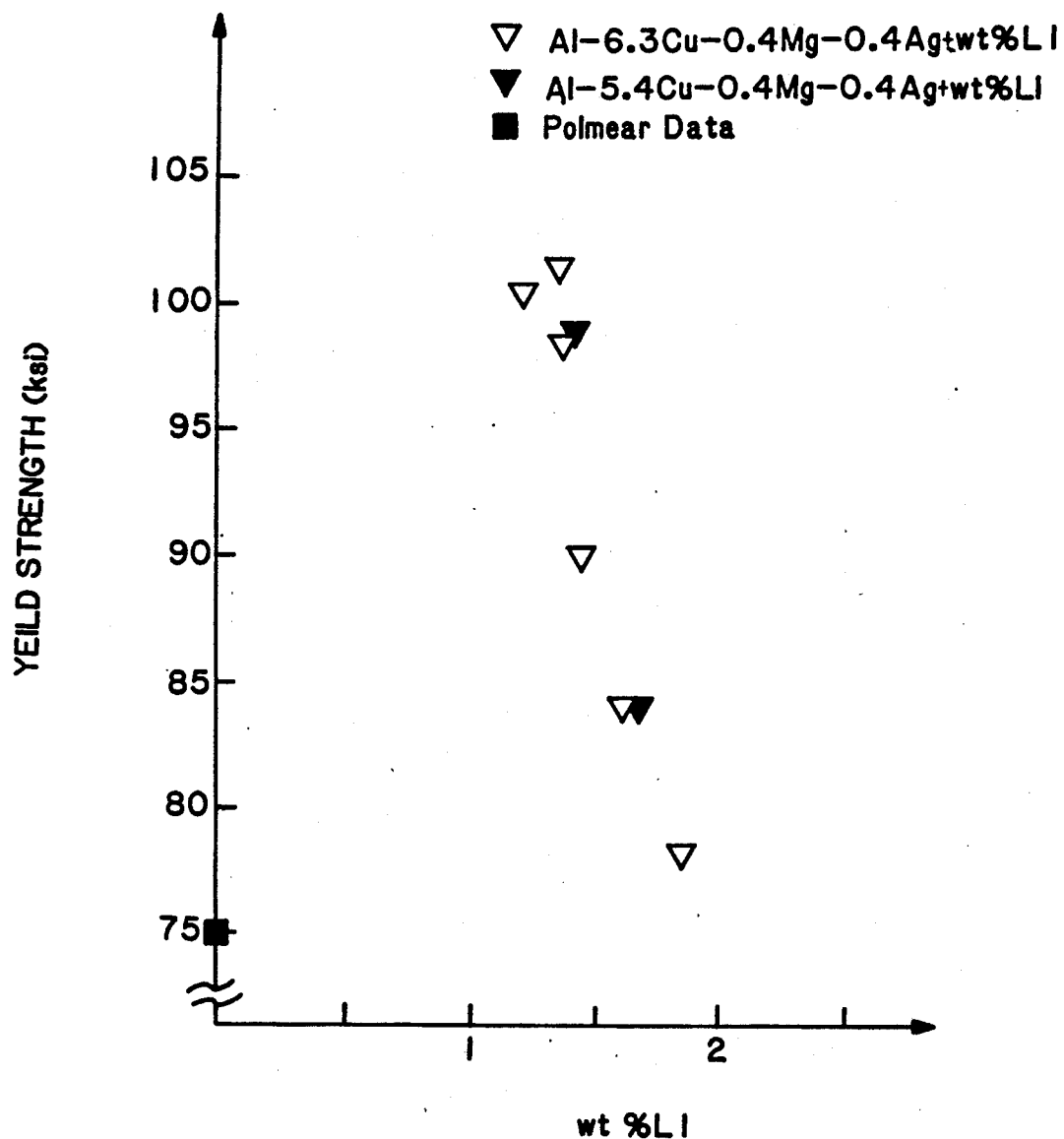
FIG. 14: Yield strength vs. weight percent lithium of Al-Cu based alloys in the SUA temper.
Figure 15:
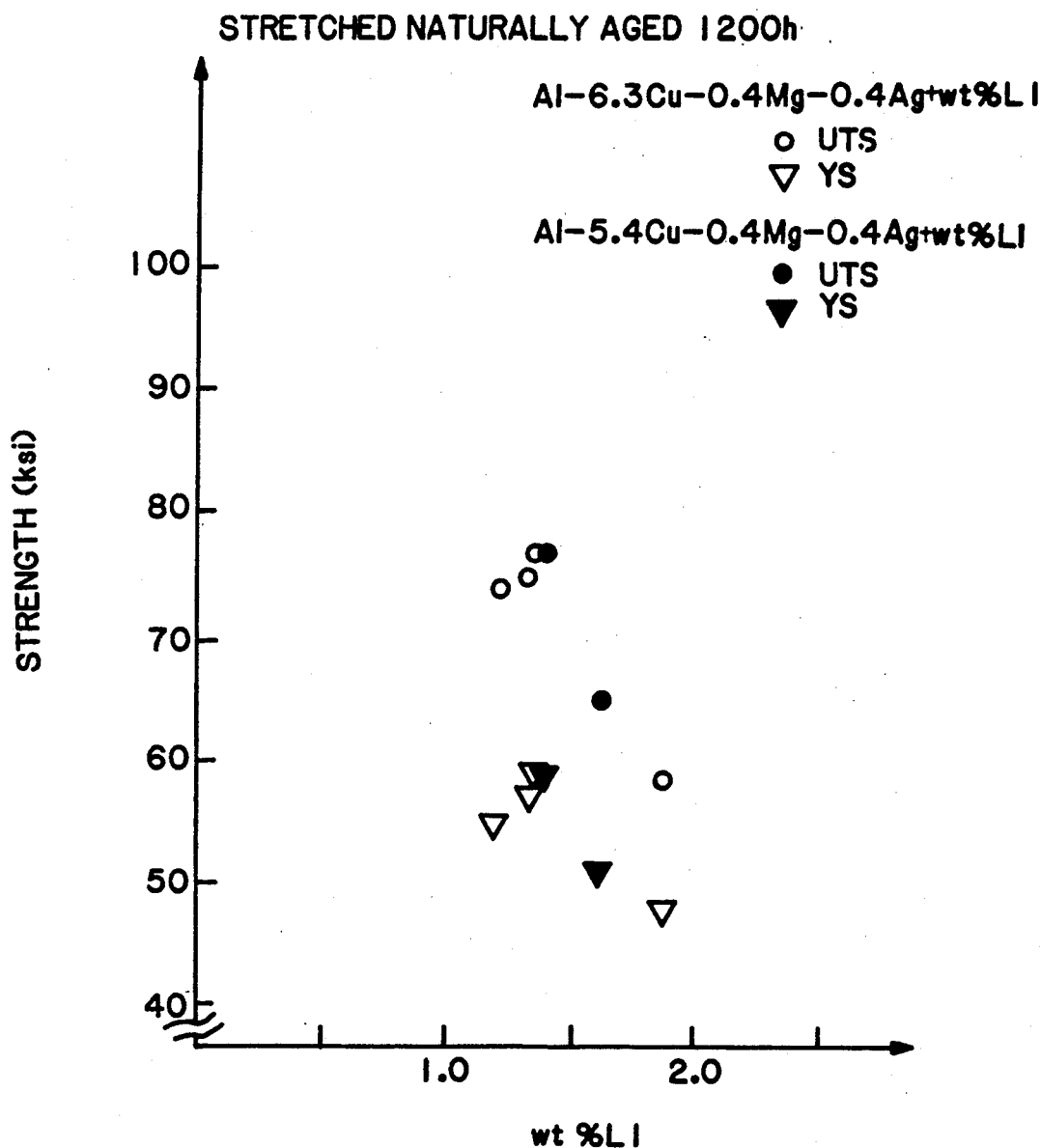
FIG. 15: Natural aged strength of three percent stretched Al-Cu based alloys as a function of lithium content.
Figure 16:
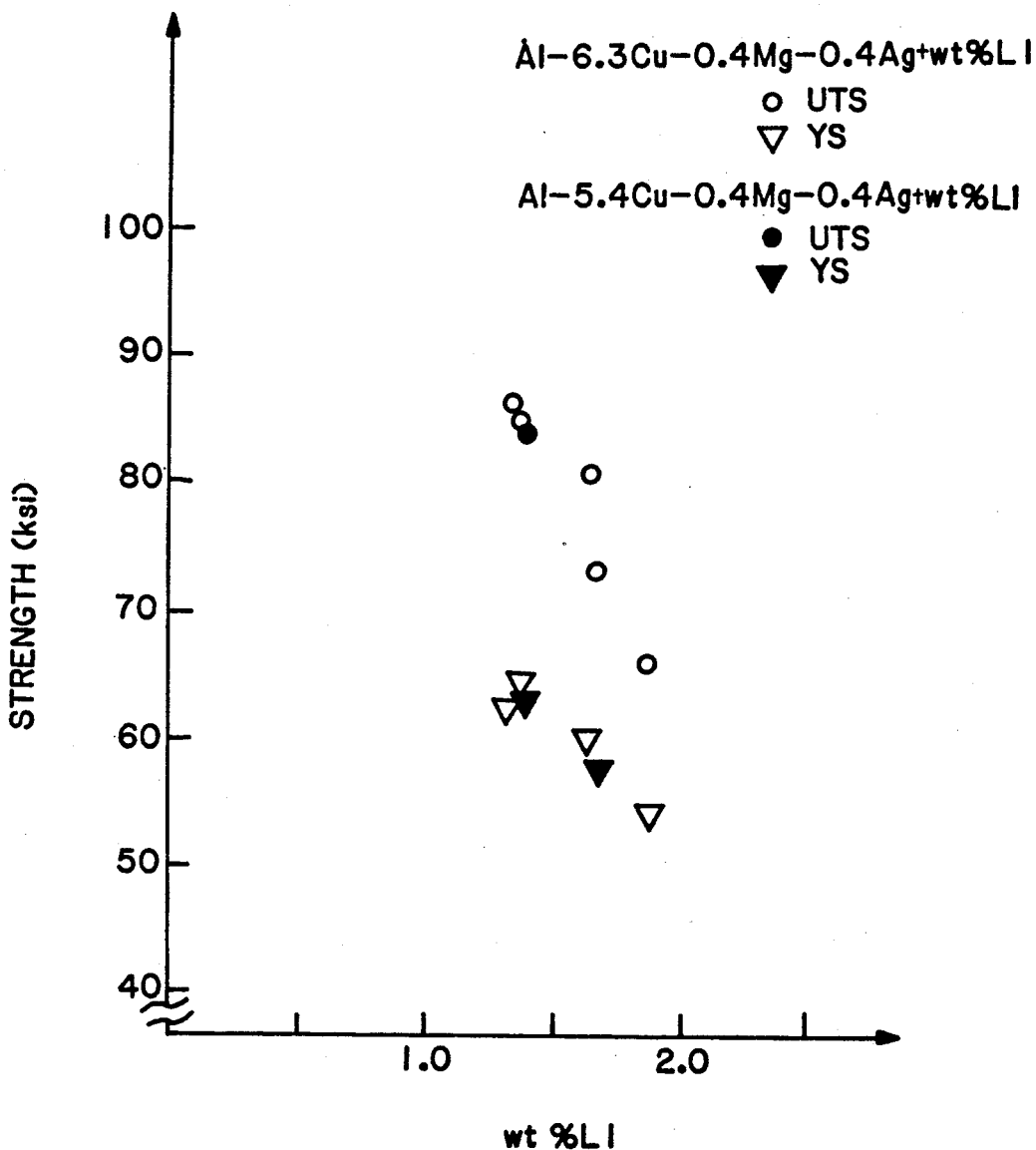
FIG. 16: Natural aged strength of unstretched Al-Cu based alloys as a function of lithium content.

The near duplicate tests of alloy 049 (i.e. alloys 059, 060, 061) reproduced the unexpectedly high properties of alloy 049 superbly (see Table XVI). The increased addition of Li to Al-Cu based alloy (064, 065, 066, 067) did indeed decrease density (Table XIV) but had an unexpected effect on strength. Both tensile and yield strength decreased, in the slightly underaged condition, with increasing Li content in the range studied (see FIGS. 13, 14). The same trend was observed for the naturally aged data both with and without cold stretch (see FIGS. 15, 16). This strength decrease is the opposite effect for virtually all practical Al-Cu-Li alloy compositions. In fact, very recent Japanese work (Yo Kojima et al., "Effect of Lithium Addition on the Elevated Temperature Properties of 2219 Alloy," *Journal of Japan Institute of Light Metals*, Vol. 36, No. 11, Nov. 1986, pp. 737-743.) related to Li-modified 2219 alloys (A1-6 wt % Cu) shows a directly related increase in yield strength with increasing Li content from 0 to 2 weight percent (see Table XVII).

The natural aging tensile data for alloys similar to type 049 alloys are higher than any reported in the literature for aluminum alloys. In fact, the tensile strengths without cold work, 84.2 to 86.1 ksi, are significantly higher than the properties of 2219 in the fully artificially aged condition. (See Table XVIII.)

Despite the fact that strength decreases with Li content from about 1.2 percent to about 1.9 weight percent, the strengths at the higher lithium level alloys are still competitive with other high strength alloys as well as conventional alloys. Thus, there are several technologically useful families of alloys within the scope of the present invention; for example, an ultra high-strength alloy (049) with a four percent decrease in density with respect to 2219, and a high strength alloy (065) with a six percent or higher density decrease.

Attempts to decrease density by lowering the copper content were successful in that strength did not change with a decrease in copper content from 6.3 to 5.4 weight percent at both the 1.4 weight percent and 1.7 weight percent lithium levels.

TABLE XIV

EXTRUSIONS OF ADDITIONAL COMPOSITIONS

| Alloy ID # | | Planned Compositions (wt. %) | | | | | Ext. Temp (°C.) | Ext. Ram Speed (in/min) | Extrusion Dimension (in) | Density | |
|---|---|---|---|---|---|---|---|---|---|---|---|
| | | Cu | Mg | Ag | Li | Zr | | | | g/cm³ | (lb/in³) |
| 058 | Planned | 6.30 | 0.40 | 0.40 | 1.40 | 0.15 | 358 | 0.10 | 2 DIA rod | 2.71 | (0.098) |
| | Measured | 5.79 | 0.38 | 0.40 | 1.34 | 0.17 | | | | | |
| 059 | Planned | 6.30 | 0.40 | 0.40 | 1.40 | 0.15 | 364 | 0.12 | 4 × ⅜ | 2.72 | (0.098) |
| | Measured | 6.21 | 0.40 | 0.43 | 1.39 | 0.16 | | | | | |
| 060 | Planned | 6.30 | 0.40 | 0.40 | 1.40 | 0.15 | 355 | 0.20 | 4 × ⅜ | 2.72 | (0.098) |
| | Measured | 6.18 | 0.40 | 0.42 | 1.32 | 0.155 | | | | | |
| 061 | Planned | 6.30 | 0.40 | 0.40 | 1.40 | 0.15 | 364 | 0.12 | 2 × ⅜ | 2.72 | (0.098) |
| | Measured | 6.33 | 0.41 | 0.42 | 1.34 | 0.16 | | | | | |
| 062 | Planned | 0.00 | 5.00 | 0.40 | 2.00 | 0.15 | 349 | 0.12 | 2 × ⅜ | 2.53 | (0.091) |
| | Measured | — | 5.40 | 0.42 | 2.10 | 0.135 | | | | | |
| 063 | Planned | 0.20 | 5.00 | 0.40 | 2.00 | 0.15 | 327 | 0.08 | 4 × ⅜ | 2.50 | (0.090) |
| | Measured | 0.22 | 5.25 | 0.41 | 2.02 | 0.14 | | | | | |
| 064 | Planned | 6.30 | 0.40 | 0.40 | 1.70 | 0.15 | 356 | 0.12 | 4 × ⅜ | 2.69 | (0.097) |
| | Measured | 6.30 | 0.41 | 0.41 | 1.62 | 0.155 | | | | | |
| 065 | Planned | 6.30 | 0.40 | 0.40 | 2.00 | 0.15 | 344 | 0.12 | 4 × ⅜ | 2.68 | (0.097) |
| | Measured | 6.31 | 0.46 | 0.41 | 1.86 | 0.145 | | | | | |
| 066 | Planned | 5.40 | 0.40 | 0.40 | 1.40 | 0.15 | 328 | 0.12 | 4 × ⅜ | 2.70 | (0.098) |
| | Measured | 5.56 | 0.46 | 0.41 | 1.38 | 0.165 | | | | | |
| 067 | Planned | 5.40 | 0.40 | 0.40 | 1.70 | 0.15 | 334 | 0.12 | 4 × ⅜ | 2.67 | (0.096) |
| | Measured | 5.55 | 0.44 | 0.40 | 1.66 | 0.16 | | | | | |

TABLE XIVa

Composition and Tensile Properties of Additional Alloys

| Alloy ID # | Cu | Mg | Ag | Li | Zr | Temper | YS (ksi) | UTS (ksi) | El (%) |
|---|---|---|---|---|---|---|---|---|---|
| 068 | 5.0 | 0.4 | 0.4 | 1.3 | 0.14 | T8 | 100.5 | 103.5 | 8.8 |
| 069 | 4.5 | 0.4 | 0.4 | 1.3 | 0.14 | T8 | 100.8 | 103.3 | 8.5 |

TABLE XV

Tensile Properties of Al—Mg Based Alloys

| Alloy | Temper | Orientation | YS (ksi) | UTS (ksi) | El (%) |
|---|---|---|---|---|---|
| 050 | SUA | L | 53.5 | 72.5 | 7.7 |
| | SUA | LT | 52.5 | 76.2 | 14.1 |
| | T3* | L | 44.9 | 59.4 | 11.9 |
| 062 | SUA | L | 55.3 | 75.2 | 9.2 |
| | T3* | L | 45.5 | 61.8 | 15.1 |
| 063 | SUA | L | 57.9 | 75.5 | 6.7 |
| | SUA | LT | 51.9 | 73.3 | 9.2 |
| | T3* | L | 46.1 | 60.0 | 12.4 |
| 01420 | SUA | L | 42.2 | 61.7 | 16.6 |
| | SUA | LT | 38.2 | 61.7 | 16.9 |

*T3 = stretched 3%, natural aged 1200 h.

TABLE XVI

Slightly Underaged Tensile Properties of Near Duplicate Heats of Alloy 049

| Alloy ID # | Orientation | Aging Temp °C. | (time) (h) | YS (ksi) | UTS (ksi) | El % |
|---|---|---|---|---|---|---|
| 049 | L | 160 | (24) | 100.4 | 103.3 | 5.1 |
| | LT | 160 | (24) | 94.1 | 97.8 | 1.9 |
| 059 | L | 160 | (20) | 99.8 | 102.4 | 5 |
| | LT | 160 | (20) | 95.8 | 99.4 | 3 |
| 060 | L | 160 | (24) | 98.7 | 101.5 | 5.4 |
| | LT | 160 | (24) | 94.1 | 99.0 | 3.0 |
| 061 | L | 160 | (24) | 101.4 | 104.0 | 4.7 |

TABLE XVII

Room Temperature Yield Strength of Li-modified 2219 Increases with Increasing Li Content

| Alloy | YS (ksi) |
|---|---|
| 2219 | 46.9 |
| 2219 + 1% Li | 67.5 |
| 2219 + 2% Li | 81.0 |
| Al + 2% Li | 24.2 |

TABLE XVIII

Natural Aging Response of Al—Cu Based Alloys (NA 1200 h)

| Alloy | Stretch | YS (ksi) | UTS (ksi) | El % | |
|---|---|---|---|---|---|
| 060 | 3% | 57.5 | 74.9 | 14.4 | |
| | 0% | 62.2 | 86.1 | 17.6 | |
| 061 | 3% | 59.0 | 77.0 | 17.4 | |
| | 0% | 64.5 | 85.2 | 14.4 | |
| 066 | 3% | 59.0 | 77.1 | 14.6 | |
| | 0% | 62.9 | 84.2 | 13.2 | |
| 2219 T81 | yes | 42.0 | 58.0 | 6 | Handbook Minimum for Extrusions |
| | | 51.0 | 66.0 | 10 | Typical |

Forgeability

A casting of alloy 058 was extruded to 2 inch diameter rod at 358° C. Sections of this rod were used as forging stock material to assess the forgability of Al-Cu based alloys. Ten 4-inch long sections were cut from the rod, and were forged using a closed die for the arm torque shaft used on a fighter aircraft. The alloy exhibited excellent forgability in this complex forging in that all ten forgings showed complete die filling and no tendency toward cracking over a range of forging temperatures from 275° to 410° C. A forging was subsequently solution heat treated at 504° C. for 90 minutes, and water quenched at 20° C. After 24 hours of natural aging, the forgings had a hardness of 77 $R_B$, similar to that of the extruded bar. Furthermore, after aging at 160° C. for 20 hours the hardness readings on the forgings ranged from 98 to 104 $R_B$ (ultimate tensile strength in ksi and hardness in $R_B$ roughly correspond one to one). This experiment demonstrates the exceptional potential of this alloy to achieve high strength in forgings without the benefit of cold work to stimulate precipitation during artificial aging. Other Al-Li alloys fail to meet strength goals in complex forgings because many forgings are not amenable to cold working, and these other alloys need cold work to reach high strength.

Quench Sensitivity

Quench sensitivity refers to the inability of a material to attain its maximum strength characteristics from precipitation processes when its cooling rate after solution heat treatment is decreased during quenching, i.e., effected by various liquid media or from heat transfer limitations through the bulk of the quenched piece. It is advantageous to have a material with low quench sensitivity where cooling rates are not critical. Quench "insensitivity" is valuable for weldments where it may not be feasible to re-heat-treat the alloy or where the weld bead and heat affected zones cool relatively slowly after welding.

As a preliminary assessment of quench sensitivity in the Al-Cu based alloy, a hardness profile was measured across a quenched two inch diameter rod (four foot length of extrusion 058). After solution heat treatment at 910° F. for 1.5 hour, 20° C. water quenching, the material was natural aged for 1400 hours, and Rockwell B measurements were taken in increments of 1/8 inch from the perifery toward the center of the extrusion as shown in Table XIX. The maximum deviation in hardness is less than 4 $R_B$ indicating low quench sensitivity. Similar hardness profiles across the 2 in. × 3/4 in. extrusion 061 showed less than 2 $R_B$ points deviation through the thickness.

Figure 17:
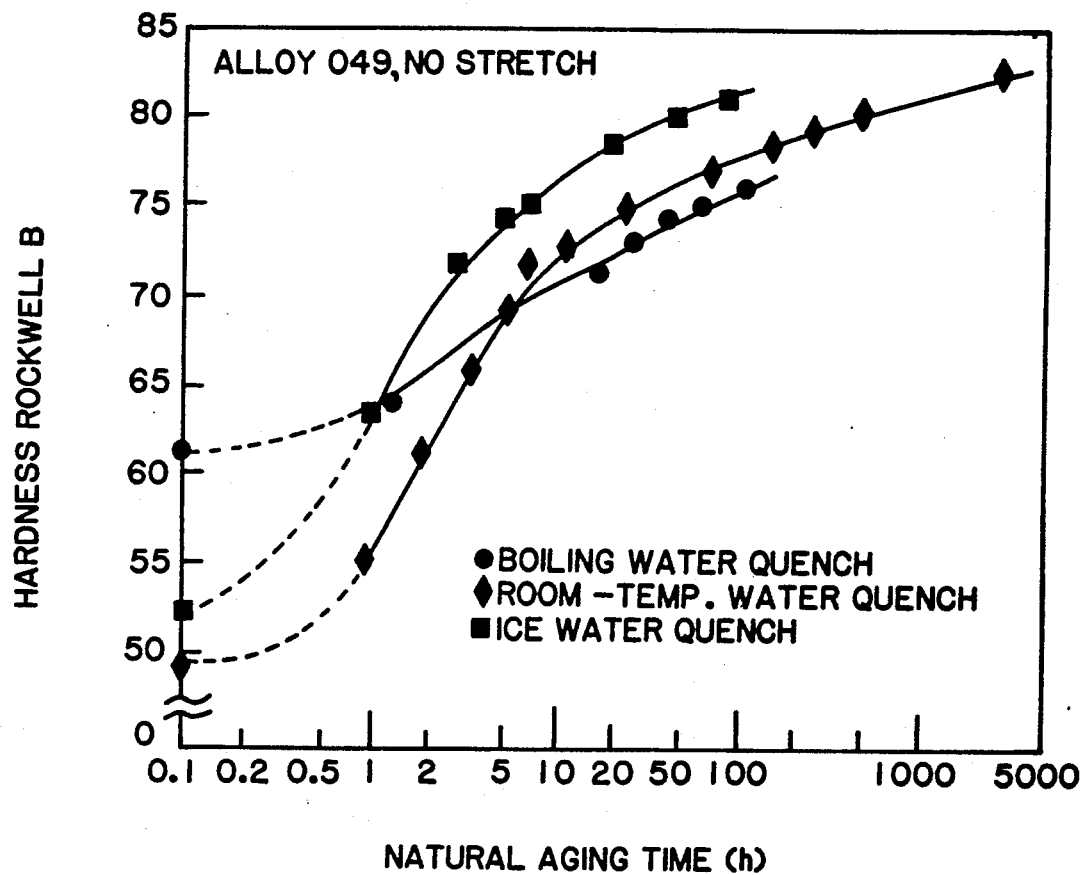
FIG. 17: Natural aging response of unstretched 049 Alloy after quenching from 504° C. into various media.

As a further evaluation of quench sensitivity, sections of alloy 049 were quenched in either water at room temperature, ice water (0° C.), or boiling water (100° C.) after solution heat treatment at 504° C. FIG. 17 shows the natural aging response of the alloy resulting after quenching from these three different quenching rates. A strong natural aging response is noted for all three quench rates. At the longest recorded aging times, no more than six Rockwell Points separate the slowest (boiling water) and fastest (ice water) quenching rates while there is little difference between standard room temperature water quench and boiling water quench. Thus, Al-Cu-Mg-Ag-Li alloys appear to be sufficiently quench insensitive to have potential for restoring strength in weldments and forgings.

This result also indicates that the exceptional strength of Al-Cu based alloys in the naturally aged condition, e.g. 62.2 ksi YS and 86.1 ksi UTS for alloy 061, could be increased further by quenching into ice water. Indeed, the natural aging curves in FIG. 17 indicate that tensile strengths greater than 85 ksi can be obtained after an ice water quench, in about 1000 hours. This is technologically significant because quenching at 0° C. is a practical plant operation. Given the unexpectedly high properties of the alloys of the present invention, it was decided to make additions of silver or silver plus magnesium to recently commercialized aluminum-lithium alloys 2090, 8090, and 8091. The compositions of these alloys are in Table XX. Additions were made of 0.4 weight percent silver to 8090 and 8091, and 0.4 weight percent silver plus 0.4 weight percent magnesium to 2090. These alloys were successfully cast and found to have improved properties.

TABLE XIX

Hardness Profiles Across a Two Inch Diameter Rod of Extrusion 058

| Distance From Surface (in.) | Hardness ($R_B$) Reading | | |
|---|---|---|---|
| | 1 | 2 | 3 |
| 1/8 | 78.5 | 79 | 79 |
| 2/8 | 81.0 | 80.5 | 80.5 |
| 3/8 | 81.0 | 81.0 | 81.0 |
| 4/8 | 80.5 | 81.0 | 80.5 |
| 5/8 | 79.5 | 80.5 | 80.5 |
| 6/8 | 79.0 | 79.0 | 79.0 |
| 7/8 | 77.5 | 78.5 | 79.0 |
| 1 | 77.5 | | |

TABLE XX

Modified Compositions of Commercial Alloys

| Alloy | Cu | Mg | Li | Ag | Zr | Al |
|---|---|---|---|---|---|---|
| 2090 Modified | 2.7 | 0.4 | 2.2 | 0.4 | 0.14 | Balance |
| 8090 Modified | 1.3 | 0.7 | 2.5 | 0.4 | 0.14 | Balance |
| 8091 Modified | 1.9 | 0.9 | 2.6 | 0.4 | 0.14 | Balance |

The alloys of the present invention also possess excellent cryogenic properties. Tests performed at cryogenic temperatures reveal improvements in tensile and yield strengths. For example, Alloy 049 in the T8 temper at −196° C. (−320° F.) displays tensile properties of 105.8 ksi YS, 108.6 ksi UTS and 3.6 percent elongation. Alloy 066 in the TB temper displays tensile properties of 101.2 ksi YS, 105.2 ksi UTS and 4.0 percent elongation at −68° C. (−80° F.), and tensile properties of 118.9 ksi YS, 124.7 ksi UTS and 3.2 percent elongation at −196° C. (−320° F.). Alloy 068 in the T8 temper at −196° C. (−320° F.) displays tensile properties of 113.6 ksi YS, 121.8 ksi UTS and 7.8 percent elongation. In the T6 temper, Alloy 68 at −196° C. (−320° F.) possesses tensile properties of 114.4 ksi YS, 119.0 ksi UTS and 2.5 percent elongation. The excellent cryogenic properties attained with the alloys of the present invention give important implications for space applications where cryogenic alloys are often necessary for fuel and oxidized tankage.

Figure 18:
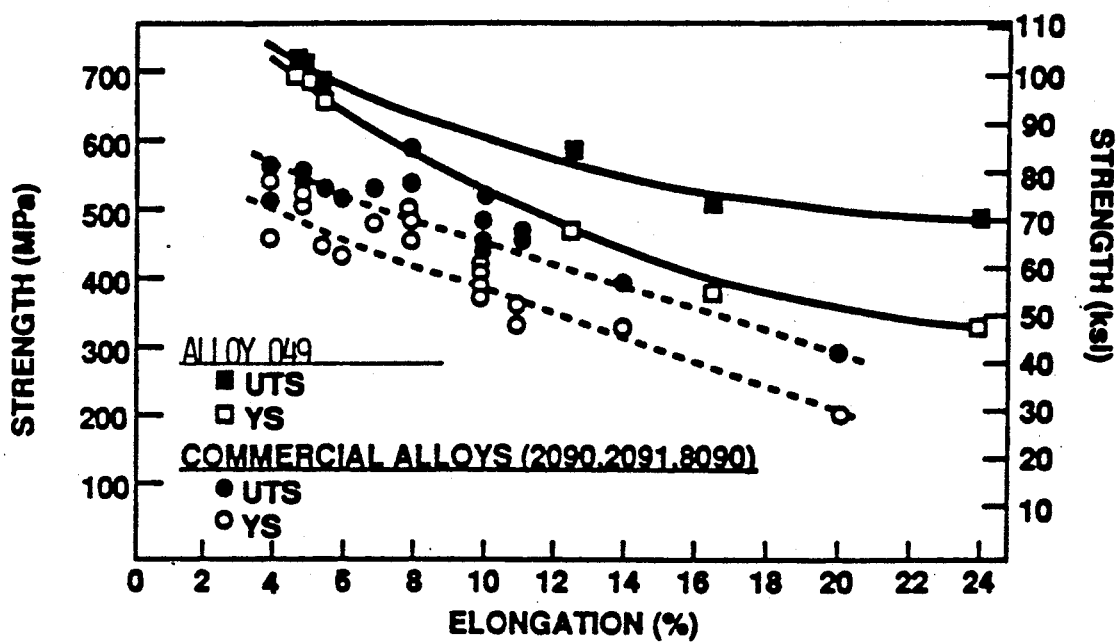
FIG. 18: Strength vs. elongation for alloy 049.

This invention thus provides a family of alloy compositions which, when suitably processed, provides exceptional strength—far greater than existing ingot metallurgy alloys of similar aluminum-based materials. The reasons for this ultra-high strength are not completely understood. Extensive transmission electron microscopy and selected area diffraction experiments failed to detect an omega phase in alloy 049, as might be expected from Polmear's work. It was observed that the $T_1$ phase (Al$_2$CuLi) is exceptionally refined in alloy 049, which may help to explain the ultra-high strength. The alloys have lower density than similar alloys as a result of the addition of lithium. The alloys show surprisingly good ductility (in the naturally aged and underaged conditions), which is unexpected for an alloy containing lithium. Furthermore, the alloys have surprising and unexpectedly high strength in the naturally-aged condition, which makes them extremely promising for weldable and forging applications. The alloys have better combinations of strength and ductility than recently commercialized Al-Li alloys such as 2090, 2091, and 8090 (see FIG. 18). Welding trails indicate that the alloys of the present invention are extremely weldable using both conventional and parent metal fillers.

It is to be understood that the above description of the present invention is susceptible to various modifications, changes, and adaptations by those skilled in the art, and that the same are to be considered to be within the spirit and scope of the invention as set forth by the claims which follow.

What is claimed:

1. An alloy consisting essentially of aluminum base metal, from about 2.0 to about 9.8 weight percent of an alloying element selected from the group consisting of copper, magnesium and mixtures thereof, said magnesium comprising at least 0.05 weight percent, from about 0.01 to about 2.0 weight percent silver, from about 0.2 to about 4.1 weight percent lithium, and from about 0.05 to about 1.0 weight percent of a grain refining additive selected from zirconium, chromium, manganese, titanium, boron, hafnium, vanadium, titanium diboride, and mixtures thereof.

2. The alloy of claim 1 wherein there is from about 2.0 to about 6.8 percent copper, and from about 0.05 to about 3.0 percent magnesium.

3. The alloy of claim 2 wherein there is from about 0.2 to about 3.1 percent lithium.

4. The alloy of claim 3 wherein there is from about 0.05 to about 1.2 percent silver.

5. The alloy of claim 3 wherein there is from about 0.1 to about 1.0 percent silver.

6. The alloy of claim 2 wherein there is from about 0.5 to about 2.7 percent lithium.

7. The alloy of claim 6 wherein there is from about 0.05 to about 1.2 percent silver.

8. The alloy of claim 6 wherein there is from about 0.1 to about 1.0 percent silver.

9. The alloy of claim 1 wherein there is from about 2.0 to about 9.8 percent magnesium, and up to about 1.5 percent copper.

10. The alloy of claim 9 wherein there is from about 0.2 to about 3.1 percent lithium.

11. The alloy of claim 10 wherein there is from about 0.05 to about 1.2 percent silver.

12. The alloy of claim 10 wherein there is from about 0.1 to about 1.0 percent silver.

13. The alloy of claim 9 wherein there is from about 0.5 to about 2.7 percent lithium.

14. The alloy of claim 13 wherein there is from about 0.05 to about 1.2 percent silver.

15. The alloy of claim 13 wherein there is from about 0.1 to about 1.0 percent silver.

16. An alloy consisting essentially of aluminum base metal, from about 2.5 to about 8.5 weight percent of an alloying element selected from the group consisting of copper, magnesium, and mixtures thereof, said magnesium comprising at least 0.05 weight percent, from about 0.05 to about 1.2 weight percent silver, from about 0.2 to about 3.1 weight percent lithium, and from about 0.05 to about 0.6 weight percent of a grain refining additive selected from zirconium, chromium, manganese, titanium, boron, hafnium, vanadium, titanium diboride, and mixtures thereof.

17. The alloy of claim 16 wherein there is from about 3.0 percent to about 6.5 percent copper, and from about 0.05 to about 2.0 percent magnesium.

18. The alloy of claim 17 wherein there is from about 0.5 to about 2.7 percent lithium.

19. The alloy of claim 18 wherein there is from about 0.05 to about 0.5 percent additive.

20. The alloy of claim 18 wherein there is from about 0.1 to about 1.0 percent silver.

21. The alloy of claim 20 wherein there is from about 0.05 to about 0.5 percent additive.

22. The alloy of claim 16, wherein there is from about 2.5 to about 7.0 percent magnesium, and from about 0.01 to about 1.0 percent copper.

23. The alloy of claim 22 wherein there is from about 0.5 to about 2.7 percent lithium.

24. The alloy of claim 23 wherein there is from about 0.05 to about 0.5 percent additive.

25. The alloy of claim 23 wherein there is from about 0.1 to about 1.0 percent silver.

26. The alloy of claim 25 wherein there is from about 0.05 to about 0.5 percent additive.

27. An aluminum base alloy consisting essentially of from about 3.1 to about 7.5 weight percent of an alloying element selected from the group consisting of copper, magnesium, and mixtures thereof, said magnesium comprising at least 0.1 weight percent, from about 0.1 to about 1.0 weight percent silver, from about 0.5 to about 2.7 weight percent lithium, and from about 0.05 to about 0.5 weight percent of a grain refining additive selected from the group consisting of zirconium, chromium, manganese, titanium, boron, hafnium, vanadium, titanium diboride, and mixtures thereof.

28. The alloy of claim 27 wherein there is from about 4.0 to about 6.5 percent copper, and from about 0.10 to about 1.0 percent magnesium.

29. The alloy of claim 27 wherein there is from about 3.0 to about 5.5 percent magnesium and from about 0.10 to about 1.0 percent copper.

30. An aluminum alloy consisting essentially of about 6.3 weight percent copper, about 0.4 percent magnesium, about 0.4 percent silver, about 1.2 percent lithium, about 0.15 percent zirconium, and the balance aluminum.

31. An aluminum alloy consisting essentially of about 5.0 weight percent magnesium, about 0.4 percent silver, about 2.0 percent lithium, about 0.15 percent grain refiner selected from the group consisting of zirconium, chromium, manganese, titanium, boron, hafnium, vanadium, titanium diboride, and mixtures thereof, and the balance aluminum.

32. An aluminum alloy consisting essentially of about 6.3 weight percent copper, about 0.4 percent magnesium, about 0.4 percent silver, about 1.4 percent lithium, about 0.15 percent grain refiner selected from the group consisting of zirconium, chromium, manganese, titanium, boron, hafnium, vanadium, titanium diboride, and mixtures thereof, and the balance aluminum.

33. An aluminum alloy consisting essentially of about 0.2 weight percent copper, about 5.0 percent magnesium, about 0.4 percent silver, about 2.0 percent lithium, about 0.15 percent grain refiner selected from the group consisting of zirconium, chromium, manganese, titanium, boron, hafnium, vanadium, titanium diboride, and mixtures thereof, and the balance aluminum.

34. An aluminum alloy consisting essentially of about 6.3 weight percent copper, about 0.4 percent magnesium, about 0.4 percent silver, about 1.7 percent lithium, about 0.15 percent grain refiner selected from the group consisting of zirconium, chromium, manganese, titanium, boron, hafnium, vanadium, titanium diboride, and mixtures thereof, and the balance aluminum.

35. An aluminum alloy consisting essentially of about 6.3 weight percent copper, about 0.4 percent magnesium, about 0.4 percent silver, about 2.0 percent lithium, about 0.15 percent grain refiner selected from the group consisting of zirconium, chromium, manganese, titanium, boron, hafnium, vanadium, titanium diboride, and mixtures thereof, and the balance aluminum.

36. An aluminum alloy consisting essentially of about 5.4 weight percent copper, about 0.4 percent magnesium, about 0.4 percent silver, about 1.4 percent lithium, about 0.15 percent grain refiner selected from the group consisting of zirconium, chromium, manganese, titanium, boron, hafnium, vanadium, titanium diboride, and mixtures thereof, and the balance aluminum.

37. An aluminum alloy consisting essentially of about 5.4 weight percent copper, about 0.4 percent magnesium, about 0.4 percent silver, about 1.7 percent lithium, about 0.15 percent grain refiner selected from the group consisting of zirconium, chromium, manganese, titanium, boron, hafnium, vanadium, titanium diboride, and mixtures thereof, and the balance aluminum.

38. An aluminum alloy consisting essentially of about 5.0 weight percent copper, about 0.4 percent Mg, about 0.4 percent silver, about 1.3 percent lithium, about 0.14 percent Zr, and the balance aluminum.

39. An aluminum alloy consisting essentially of about 4.5 weight percent copper, about 0.4 percent Mg, about 0.4 percent silver, about 1.3 percent lithium, about 0.14 percent Zr, and the balance aluminum.

40. An aluminum-base alloy consisting essentially of from about 2.0 to about 6.8 weight percent Cu, from about 0.05 to about 3.0 weight percent Mg, from about 0.01 to about 2.0 weight percent Ag, from about 0.2 to about 4.1 weight percent Li, less than about 1.0 weight percent grain refiner selected from the group consisting of Zr, Cr, Mn, Ti, B, Hf, V, TiB$_2$, and mixtures thereof, the balance aluminum and incidental impurities.

41. An alloy according to claim 40, wherein the grain refiner comprises from about 0.05 to about 0.2 weight percent.

42. An alloy according to claim 40, wherein the grain refiner comprises Zr.

43. An alloy according to claim 42, wherein the grain refiner further comprises Ti.

44. An alloy according to claim 40, wherein the Mg comprises from about 0.1 to about 1.0 weight percent.

45. An alloy according to claim 40, wherein the Mg comprises from about 0.3 to about 0.5 weight percent.

46. An alloy according to claim 40, wherein the Ag comprises from about 0.05 to about 1.2 weight percent.

47. An alloy according to claim 40, wherein the Ag comprises from about 0.1 to about 1.0 weight percent.

48. An alloy according to claim 40, wherein the Ag comprises from about 0.3 to about 0.5 weight percent.

49. An alloy according to claim 40, wherein the Li comprises from about 0.2 to about 3.1 weight percent.

50. An alloy according to claim 40, wherein the Li comprises from about 0.5 to about 2.7 weight percent.

51. An alloy according to claim 40, wherein the Li comprises from about 1.0 about 1.4 weight percent.

52. An aluminum-base alloy consisting essentially of from about 3.0 to about 6.5 weight percent Cu, from about 0.05 to about 2.0 weight percent Mg, from about 0.05 to about 1.2 weight percent Ag, from about 0.2 to about 3.1 weight percent Li, less than about 0.6 weight percent grain refiner selected from the group consisting of Zr, Cr, Mn, Ti, B, hf, V, TiB$_2$, and mixtures thereof, the balance aluminum and incidental impurities.

53. An alloy according to claim 52, wherein the grain refiner comprises from about 0.05 to about 0.2 weight percent.

54. An alloy according to claim 53, wherein the grainer refiner comprises Zr.

55. An alloy according to claim 54, wherein the grain refiner further comprises Ti.

56. An alloy according to claim 52, wherein the Mg comprises from about 0.1 to about 1.0 weight percent.

57. An alloy according to claim 52, wherein the Mg comprises from about 0.3 to about 0.5 weight percent.

58. An alloy according to claim 52, wherein the Ag comprises from about 0.1 to about 1.0 weight percent.

59. An alloy according to claim 52, wherein the Ag comprises from about 0.3 to about 0.5 weight percent.

60. An alloy according to claim 52, wherein the Li comprises from about 0.5 to about 2.7 weight percent.

61. An alloy according to claim 52, wherein the Li comprises from about 1.0 to about 1.4 weight percent.

62. An aluminum-base alloy consisting essentially of from about 4.0 to about 6.5 weight percent Cu, from about 0.1 to about 1.0 weight percent Mg, from about 0.1 to about 1.0 weight percent Ag, from about 0.5 to about 2.7 weight percent Li, less than about 0.5 weight percent grain refiner selected from the group consisting of Zr, Cr, Mn, Ti, B, Hf, V, TiB$_2$, and mixtures thereof, the balance aluminum and incidental impurities.

63. An alloy according to claim 62, wherein the grain refiner comprises from about 0.05 to about 0.2 weight percent.

64. An alloy according to claim 63, wherein the grain refiner comprises Zr.

65. An alloy according to claim 64, wherein the grain refiner further comprises Ti.

66. An alloy according to claim 62, wherein the Mg comprises from about 0.3 to about 0.5 weight percent.

67. An alloy according to claim 62, wherein the Ag comprises from about 0.3 to about 0.5 weight percent.

68. An alloy according to claim 62, wherein the Li comprises from about 1.0 to about 1.4 weight percent.

69. An aluminum-base alloy consisting essentially of from about 4.8 to about 5.2 weight percent Cu, from about 0.3 to about 0.5 weight percent Mg, from about 0.3 to about 0.5 weight percent Ag, from about 1.0 to about 1.4 weight percent Li, from about 0.08 to about 0.2 weight percent grain refiner selected from the group consisting of Zr, Cr, Mn, Ti, B, Hf, V, TiB$_2$, and mixtures thereof, the balance aluminum and incidental impurities.

70. An alloy according to claim 69, wherein the grain refiner comprises Zr.

71. An alloy according to claim 70, wherein the grainer refiner further comprises Ti.

72. A weldable aluminum-base alloy consisting essentially of from about 4.0 to about 6.5 weight percent Cu, from about 0.1 to about 1.0 weight percent Mg, from about 0.1 to about 1.0 weight percent Ag, from about 0.5 to about 2.7 weight percent Li, less than about 0.5 weight percent grain refiner selected from the group consisting of Zr, Cr, Mn, Ti, B, Hf, V, TiB$_2$, and mixtures thereof, the balance aluminum and incidental impurities.

73. A weldable alloy according to claim 72, wherein the Cu comprises from about 4.8 to about 5.2 weight percent, the Mg comprises from about 0.3 to about 0.5 weight percent, the Ag comprises from about 0.3 to about 0.5 weight percent, the Li comprises from about 1.0 to about 1.4 weight percent, and the grain refiner comprises from about 0.08 to about 0.2 weight percent.

74. A weldable alloy according to claim 73, wherein the grain refiner comprises Zr.

75. A cryogenic aluminum-base alloy consisting essentially of from about 3.0 to about 6.5 weight percent Cu, from about 0.05 to about 2.0 weight percent Mg, from about 0.05 to about 1.2 weight percent Ag, from about 0.2 to about 3.1 weight percent Li, less than about 0.6 weight percent grain refiner selected from the group consisting of Zr, Cr, Mn, Ti, B, Hf, V, TiB$_2$, and mixtures thereof, the balance aluminum and incidental impurities.

76. A cryogenic alloy according to claim 75, wherein the Cu comprises from about 4.8 to about 5.2 weight percent, the Mg comprises from about 0.3 to about 0.5 weight percent, the Ag comprises from about 0.3 to about 0.5 weight percent, the Li comprises from about 1.0 to about 1.4 weight percent, and the grain refiner comprises from about 0.08 to about 0.2 weight percent.

77. A cryogenic alloy according to claim 76, wherein the grain refiner comprises Zr.

78. An aluminum-base alloy consisting essentially of from 0 to about 1.5 weight percent Cu, from about 2.0 to about 9.8 weight percent Mg, from about 0.01 to about 2.0 weight percent Ag, from about 0.2 to about 4.1 weight percent Li, from about 0.05 to about 1.0 weight percent grain refiner selected from the group consisting of Zr, Cr, Mn, Ti, B, Hf, V, TiB$_2$, and mixtures thereof, the balance aluminum and incidental impurities.

79. An aluminum-base alloy consisting essentially of from 0 to about 1.0 weight percent Cu, from about 2.5 to about 7.0 weight percent Mg, from about 0.05 to about 1.2 weight percent Ag, from about 0.2 to about 3.1 weight percent Li, from about 0.05 to about 0.6 weight percent grain refiner selected from the group consisting of Zr, Cr, Mn, Ti, B, Hf, V, TiB$_2$ and mixtures thereof, the balance aluminum and incidental impurities.

80. An aluminum-base alloy consisting essentially of from 0 to about 1.0 weight percent Cu, from about 3.0 to about 5.5 weight percent Mg, from about 0.1 to about 1.0 weight percent Ag, from about 0.5 to about 2.7 weight percent Li, from about 0.05 to about 0.05 weight percent grain refiner selected from the group consisting of Zr, Cr, Mn, Ti, B, Hf, V, TiB$_2$, and mixtures thereof, the balance aluminum and incidental impurities.

81. An aluminum-base alloy consisting essentially of from 0 to about 1.0 weight percent Cu, from about 3.0 to about 5.5 weight percent Mg, from about 0.3 to about 0.5 weight percent Ag, from about 0.5 to about 2.7 weight percent Li, from about 0.05 to about 0.5 weight percent grain refiner selected from the group consisting of Zr, Cr, Mn, Ti, B, Hf, V, TiB$_2$, and mixtures thereof, the balance aluminum and incidental impurities.

82. An alloy according to claim 79, wherein the Cu comprises at least about 0.01 weight percent.

83. An alloy according to claim 80, wherein the Cu comprises at least about 0.1 weight percent.

84. An alloy according to claim 81, wherein the Cu comprises at least about 0.1 weight percent.

* * * * *

UNITED STATES PATENT AND TRADEMARK OFFICE
CERTIFICATE OF CORRECTION

PATENT NO. : 5,032,359
DATED : July 16, 1991
INVENTOR(S) : Joseph R. Pickens et al It is certified that error appears in the above-identified patent and that said Letters Patent is hereby corrected as shown below:

Column 1, line 52, after "15-" add --20--.

Column 2, line 62, "god" should read --good--.

Column 5, Table II, the data on the "Planned" line in the "Density" column, in each case, should be on the "Actual" line.

Column 5, line 44, "al.1" should read --all--.

Column 7, Table V, Alloy 050, under "El" heading, "11.0" should read --11.9--.

Column 7, Table VII, under Alloy heading, "8091" should read --8091 T651--

Column 13, Table XIV, Alloy 063, on the "Planned" line, under "Extrusion Dimension" heading, "3/4" should read --3/8--.

Column 14, Table XVIII, Alloy 066, second line under "El" heading, "13.2" should read --13.4--.

Column 19, line 55, before "about" and after "1.0" insert --to--.

UNITED STATES PATENT AND TRADEMARK OFFICE
CERTIFICATE OF CORRECTION

PATENT NO. : 5,032,359
DATED : July 16, 1991
INVENTOR(S) : Joseph R. Pickens et al It is certified that error appears in the above-indentified patent and that said Letters Patent is hereby corrected as shown below:

Column 22, line 10, "0.05 weight" should read --0.5 weight--.

Signed and Sealed this

Eighth Day of June, 1993

Attest:

MICHAEL K. KIRK

Attesting Officer    Acting Commissioner of Patents and Trademarks